United States Patent
Saito et al.

(10) Patent No.: US 9,792,730 B2
(45) Date of Patent: Oct. 17, 2017

(54) DISPLAY CONTROL METHOD, SYSTEM AND MEDIUM

(71) Applicant: FUJITSU LIMITED, Kawasaki-shi, Kanagawa (JP)

(72) Inventors: Keisuke Saito, Kawasaki (JP); Susumu Koga, Kawasaki (JP); Aya Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 282 days.

(21) Appl. No.: 14/509,709

(22) Filed: Oct. 8, 2014

(65) Prior Publication Data

US 2015/0116314 A1    Apr. 30, 2015

(30) Foreign Application Priority Data

Oct. 24, 2013  (JP) .................................. 2013-221648

(51) Int. Cl.
G06T 15/00    (2011.01)
G06T 19/00    (2011.01)
(Continued)

(52) U.S. Cl.
CPC .............. *G06T 19/006* (2013.01); *G06F 3/14* (2013.01); *G06K 9/00671* (2013.01);
(Continued)

(58) Field of Classification Search
CPC .............. G06K 9/00671; G06T 19/006; G06T 2207/10016; G06T 2207/30204; G09G 2340/12; G09G 5/393; G06F 3/14
(Continued)

(56) References Cited

U.S. PATENT DOCUMENTS 8,570,320 B2 * 10/2013 Izadi ...................... G06T 17/00
345/156
8,638,986 B2 * 1/2014 Jiang ..................... G01C 11/00
348/135
(Continued)

FOREIGN PATENT DOCUMENTS

CN         103165106      6/2013
JP    WO 2005-119539 A1  12/2005
(Continued)

OTHER PUBLICATIONS

Keisuke Tateno, Itaru Kitahara, Yuichi Ohta, A nested marker for augmented reality, ACM SIGGRAPH 2006 Sketches, Jul. 30-Aug. 3, 2006, Boston, Massachusetts [doi>10.1145/1179849.1180039].*

(Continued)

*Primary Examiner* — Phu K Nguyen
(74) *Attorney, Agent, or Firm* — Oblon, McClelland, Maier & Neustadt, L.L.P.

(57) ABSTRACT

A non-transitory computer-readable medium storing computer-program, which when executed by a system, causes the system to: obtain first image data from an image capture device; detect certain image data corresponding to a reference object from the first image data; control a display to display object data on the first image data when the certain image is detected, the object data being associated with the certain image data and stored in a memory; obtain second image data from the image capture device; control the display to continue displaying the object data on the first image when a certain operation to the image capture device is detected; and control the display to display the second image data when the certain operation is not detected.

17 Claims, 26 Drawing Sheets

(51) Int. Cl.
    *G06F 3/14*     (2006.01)
    *G06K 9/00*     (2006.01)
    *G09G 5/393*     (2006.01)

(52) U.S. Cl.
    CPC .... *G09G 5/393* (2013.01); *G06T 2207/10016* (2013.01); *G06T 2207/30204* (2013.01); *G09G 2340/12* (2013.01)

(58) Field of Classification Search
    USPC .......................................................... 345/419
    See application file for complete search history.

(56) References Cited

U.S. PATENT DOCUMENTS

| | | | |
|---|---|---|---|
| 8,933,889 B2* | 1/2015 | Heikkinen | A63F 13/52 |
| | | | 345/169 |
| 9,076,041 B2* | 7/2015 | Bentley | A63F 13/00 |
| 9,147,122 B2* | 9/2015 | Chao | G06K 9/4604 |
| 9,405,359 B2* | 8/2016 | Rhee | G06F 3/005 |
| 9,418,705 B2* | 8/2016 | Kaps | G11B 27/17 |
| 2007/0024527 A1 | 2/2007 | Heikkinen et al. | |
| 2007/0118739 A1 | 5/2007 | Togashi et al. | |
| 2008/0310686 A1 | 12/2008 | Kretz | |
| 2013/0009891 A1 | 1/2013 | Watanabe et al. | |
| 2013/0120450 A1* | 5/2013 | Kim | G09G 5/22 |
| | | | 345/633 |
| 2013/0155305 A1* | 6/2013 | Shintani | H04N 5/23293 |
| | | | 348/333.01 |
| 2014/0009494 A1 | 1/2014 | Kasahara | |
| 2016/0284133 A1 | 9/2016 | Kasahara | |

FOREIGN PATENT DOCUMENTS

| | | |
|---|---|---|
| JP | 2008-186280 | 8/2008 |
| JP | 2010-531089 | 9/2010 |
| JP | 2012-212343 | 11/2012 |
| JP | 2013-016018 | 1/2013 |

OTHER PUBLICATIONS

Extended Search Report issued Mar. 6, 2015 in European Patent Application No. 14189178.8.

European Office Action of European Patent Application No. 14189178.8 dated Jul. 14, 2017, 6 pages.

Office Action of Japanese Patent Application No. 2013-221648 date Aug. 8 2017 (with machine generated English Translation).

Office Action of Chinese Patent Application No. 201410566978.4 dated Mar. 16, 2017 with English translation, 19 pages.

* cited by examiner

FIG. 3

$$M = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 4

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 9

| TEMPLATE ID | | T1 | |
|---|---|---|---|
| VERTEX COORDINATES | 0 | (0, 0, 0) | ⎫ |
| | 1 | (X3m, Y3m, Z3m) | |
| | 2 | (X4m, Y4m, Z4m) | |
| | 3 | (X5m, Y5m, Z5m) | T21 |
| | 4 | (X6m, Y6m, Z6m) | |
| | 5 | ... | |
| | 6 | ... | |
| | 7 | ... | |
| | ... | ... | ⎭ |
| 1 | VERTEX ORDER | 1, 3, 4, 5, 7 | ⎫ |
| | TEXTURE ID | 21 | |
| 2 | VERTEX ORDER | 2, 3, 4, 5, 6 | T22 |
| | TEXTURE ID | 21 | |
| ... | VERTEX ORDER | ... | |
| | TEXTURE ID | ... | ⎭ |

FIG. 10

| CONTENT ID | Xm | Ym | Zm | Pm | Qm | Rm | Jx | Jy | Jz | TEMPLATE ID | MARKER ID | ADDITIONAL INFORMATION |
|---|---|---|---|---|---|---|---|---|---|---|---|---|
| C1 | Xm1 | Ym1 | Zm1 | Pm1 | Qm1 | Rm1 | Jx1 | Jy1 | Jz1 | T1 | M1 | PERFORM ONE OF THE OPERATIONS TO CALL THE MANUAL. FLICK UP: MANUAL FOR WORK A FLICK DOWN: MANUAL FOR WORK B |
| C2 | Xm2 | Ym2 | Zm2 | Pm2 | Qm2 | Rm2 | Jx2 | Jy2 | Jz2 | T3 | M1 | |
| | | | | | | | | | | | | |

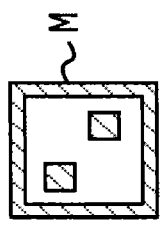
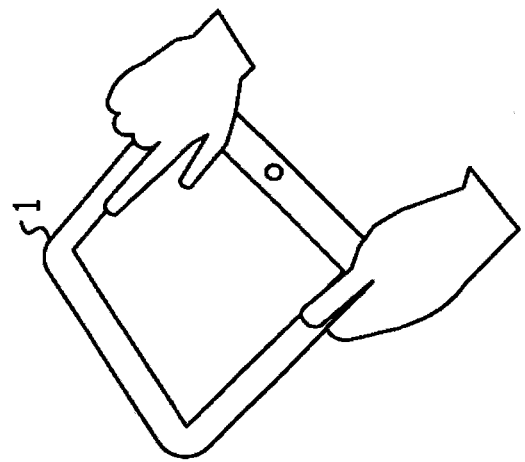
FIG. 13A
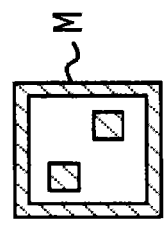
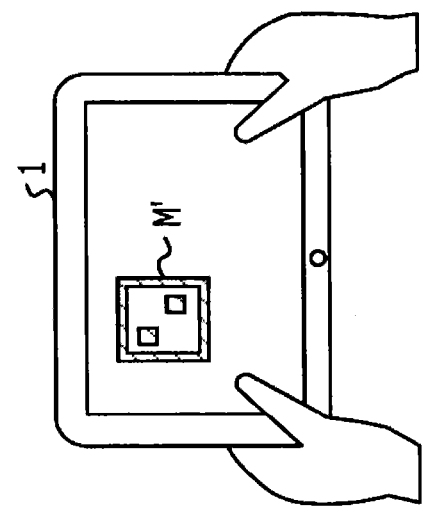
FIG. 13B

FIG. 16

| CONTENT ID | OPERATION TYPE | ADDITIONAL CONTENT ID | ACCESS DESTINATION |
|---|---|---|---|
| C1 | FLICK UP | SC1 | URL1 |
| C1 | FLICK DOWN | SC2 | URL2 |
| C2 | TAP | SC3 | URL3 |
| ... | ... | ... | ... |

FIG. 23

$$R4 = \begin{bmatrix} 1 & 0 & 0 & 0 \\ 0 & 1 & 0 & 0 \\ 0 & 0 & 1 & 0 \\ X2c & Y2c & Z2c & 1 \end{bmatrix} \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix} \begin{bmatrix} 1 & 0 & 0 & 0 \\ 0 & 1 & 0 & 0 \\ 0 & 0 & 1 & 0 \\ -X2c & -Y2c & -Z2c & 1 \end{bmatrix}$$

DISPLAY CONTROL METHOD, SYSTEM AND MEDIUM

CROSS-REFERENCE TO RELATED APPLICATION

This application is based upon and claims the benefit of priority of the prior Japanese Patent Application No. 2013-221648 filed on Oct. 24, 2013, the entire contents of which are incorporated herein by reference.

FIELD

The embodiments discussed herein are related to a technology for controlling a display mode in augmented reality technology.

BACKGROUND

A technology has been available in which model data of a three-dimensional object arranged in a three-dimensional virtual space corresponding to real space is displayed superimposed on an image captured by a camera. This technology is called augmented reality (AR) technology or the like, since information to be collected by human perception (such as vision) is augmented. Model data of a three-dimensional object arranged in a three-dimensional virtual space corresponding to the real space is also called content.

AR technology enables a projected image of content to be generated based on pre-specified arrangement information and enables the projected image to be displayed superimposed on a captured image. The projected image of the content is generated based on a positional relationship between the position of a camera and the arrangement position of the content.

In order to determine the positional relationship, a reference item is used. A typical example used as the reference item is a marker. Thus, when the marker is detected from an image captured by the camera, the positional relationship between the marker and the camera is determined based on a marker image captured in the image captured by the camera. The positional relationship is reflected to generate a projected image of the content associated with the marker, and projected image is displayed superimposed on the captured image (for example, Japanese National Publication of International Patent Application No. 2010-531089 and International Publication Pamphlet No. 2005-119539).

SUMMARY

According to an aspect of the invention, a non-transitory computer-readable medium storing computer-program, which when executed by a system, causes the system to: obtain first image data from an image capture device; detect certain image data corresponding to a reference object from the first image data; control a display to display object data on the first image data when the certain image is detected, the object data being associated with the certain image data and stored in a memory; obtain second image data from the image capture device; control the display to continue displaying the object data on the first image when a certain operation to the image capture device is detected; and control the display to display the second image data when the certain operation is not detected.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts a transformation matrix for transformation from the marker coordinate system into the camera coordinate system and a rotation matrix in the transformation matrix;

FIG. 4 depicts rotation matrices;

FIG. 9 illustrates an example data structure of a template storage unit;

FIG. 10 illustrates an example data structure of a content storage unit;

FIGS. 13A and 13B illustrate a relationship between a user's posture of holding the information processing apparatus and a load;

FIG. 16 illustrates an example data structure of a management-information storage unit;

FIG. 23 illustrates a rotation matrix for performing transformation corresponding to the setting of a virtual camera;

DESCRIPTION OF EMBODIMENTS

Figure 1:
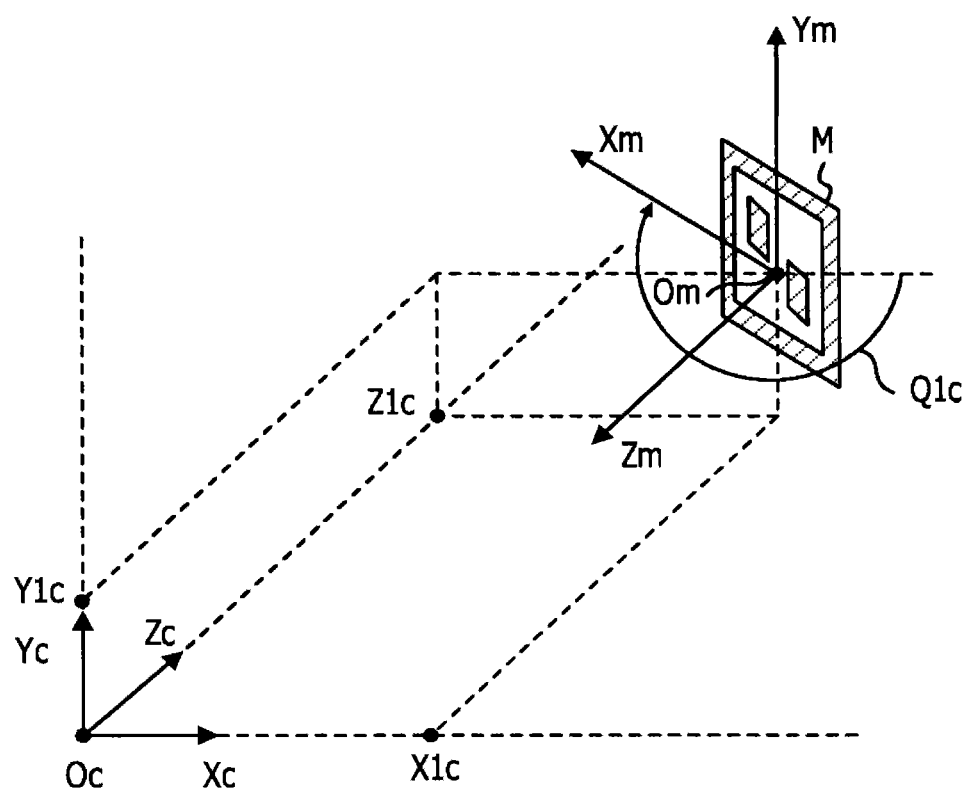
FIG. 1 illustrates a relationship between a camera coordinate system and a marker coordinate system.

In a state in which a composite image, in which a projected image of content is displayed superimposed on a captured image, is displayed, a user may perform an operation, such as a selection operation, on the composite image. For example, when a display device that displays the composite image is a touch panel display, the user designates, on the touch panel thereof, a position in a region in which the projected image is displayed. For example, content that exists at the designated position is selected, and processing, for example, displaying the projected image of the content with a larger size and/or displaying other content associated with that content, is executed.

In this case, for performing an operation on the composite image displayed on the display device, the user performs the operation with one hand while supporting an information processing apparatus with the other hand. The information processing apparatus is a computer having the display device and a camera, for example, a tablet personal computer (PC) equipped with a camera.

Since the user holds the information processing apparatus with one hand, the holding of the information processing apparatus may become unstable, thus making it difficult for the camera to capture part of or the entirety of the marker. Unless the marker is captured in the image captured by the camera, the information processing apparatus is not able to display a composite image. Consequently, the user may not be able to check a selection operation or the like on a composite image.

Thus, the user holds the information processing apparatus with one hand while considering the image capture range of the camera so that an image of the marker can be captured, and also executes an operation with the other hand while maintaining the holding state. That is, the user's load during operation is large.

In addition, while the user continues to view content displayed in a composite image, it is important that the user maintain the image capture range of the camera so that an image of the marker can be captured. Thus, the user's load of holding the camera-equipped information processing apparatus so as to maintain the state in which the marker can be recognized is also high for operations other than a selection operation.

Accordingly, an object of the present disclosure is to reduce the user's load of holding an information processing apparatus.

Embodiments will be described below with reference to the accompanying drawings. The individual embodiments described hereinafter may also be combined as appropriate within a scope that causes no contradiction in processing details.

First, a description will be given of an augmented reality (AR) technology in which content arranged in a three-dimensional virtual space corresponding to real space is displayed superimposed on an image (referred to as an "input image") captured by a camera. The content is model data of a three-dimensional object arranged in the virtual space. The model data is also referred to as an "object".

In order to display content on a captured image in a superimposed manner, a process for creating content is performed by setting the arrangement position and arrangement attitude of the object in the virtual space. This process is generally called a content authoring process.

The object is, for example, model data including multiple points. Patterns (textures) are set for respective faces obtained by interpolating the multiple points with straight lines and/or curved lines, and the faces are combined to form a three-dimensional model.

As arrangement of content in the virtual space, the coordinates of points that constitute the object is determined with reference to a reference item that exists in the real space. The content does not exist in the real space and is virtually arranged in the virtual space with reference to the reference item.

While the content is arranged in the virtual space, a positional relationship between the camera and the reference item in the real space is determined based on how the reference item captured in the image captured by the camera is seen (that is, based on an image of the reference item). A positional relationship between the camera and the content in the virtual space is determined based on the positional relationship between the camera and the reference item in the real space and the arrangement position of the content (a positional relationship between the reference item and the content) in the virtual space. Then, since an image acquired when a virtual camera arranged in the virtual space captures the content is determined based on the positional relationship between the camera and the content in the virtual space, the content can be displayed superimposed on the captured image.

The virtual camera in this case is just a camera virtually arranged in the virtual space, and is thus capable of virtually capturing images of the virtual space from any position (line of sight). That is, it is possible to change the position of the virtual camera through settings, thus making it possible to control the display state of the content in a composite image.

For example, when the position of the virtual camera is set in the same manner as the position of the camera in the real space, an image acquired when an image of content is captured from, in the virtual space corresponding to the real space, the same position as that of the camera in the real space is projected onto the composite image. On the other hand, when the position of the virtual camera is set independently of the position of the actual camera, an image of the virtual space captured from a position that is different from that of the camera in the real space is projected onto the composite image. Although details are described below, a composite image like that obtained by capturing, from an overhead perspective, an image of the virtual space in which the content is arranged is generated depending on the setting of the virtual camera.

A computational operation for generating an image of content will further be described with reference to FIGS. 1, 2, 3, and 4. FIG. 1 illustrates a relationship between a camera coordinate system and a marker coordinate system. A marker M illustrated in FIG. 1 is an example of a reference item. The marker M illustrated in FIG. 1 has a square shape, the size of which is pre-defined (for example, the length of one side is 5 cm or the like). Although the marker M illustrated in FIG. 1 has a square shape, the reference item may be another item having a shape whose relative position and orientation from the camera can be determined based on an image acquired by image capturing from any of multiple points of view.

The camera coordinate system is constituted by three dimensions (Xc, Yc, Zc) and has an origin Oc, for example, at the focal point of the camera. For example, the plane Xc-Yc of the camera coordinate system is parallel to an image-capture-element plane of the camera, and the axis Zc is orthogonal to the image-capture-element plane.

The position set as the origin Oc corresponds to the position of the virtual camera. That is, when a virtual camera like a camera that captures an image of the virtual space from an overhead perspective is set, the plane Xc-Yc of the camera coordinate system is set as a plane orthogonal to the image-capture-element plane of the camera, and the axis Zc serves as an axis parallel to the image-capture-element plane. A known scheme may be used to set the virtual camera in this AR technology.

The marker coordinate system is constituted by three dimensions (Xm, Ym, Zm) and has an origin Om, for example, at the center of the marker M. For example, the plane Xm-Ym of the marker coordinate system is parallel to a face of the marker M, and the axis Zm is orthogonal to the face of the marker M. In the camera coordinate system, the origin Om is represented by coordinates V1c (X1c, Y1c, Z1c).

A rotation angle in the marker coordinate system (Xm, Ym, Zm) with respect to the camera coordinate system (Xc, Yc, Zc) is represented by rotation coordinates G1c (P1c, Q1c, R1c). P1c indicates a rotation angle about the axis Xc, Q1c indicates a rotation angle about the axis Yc, and R1c indicates a rotation angle about the axis Zc. In the marker coordinate system illustrated in FIG. 1, since rotation is made only about the axis Ym, P1c and R1c are 0. The rotation angle about each axis is calculated based on as what image a reference item having a known shape is captured in a captured image to be processed.

Figure 2:
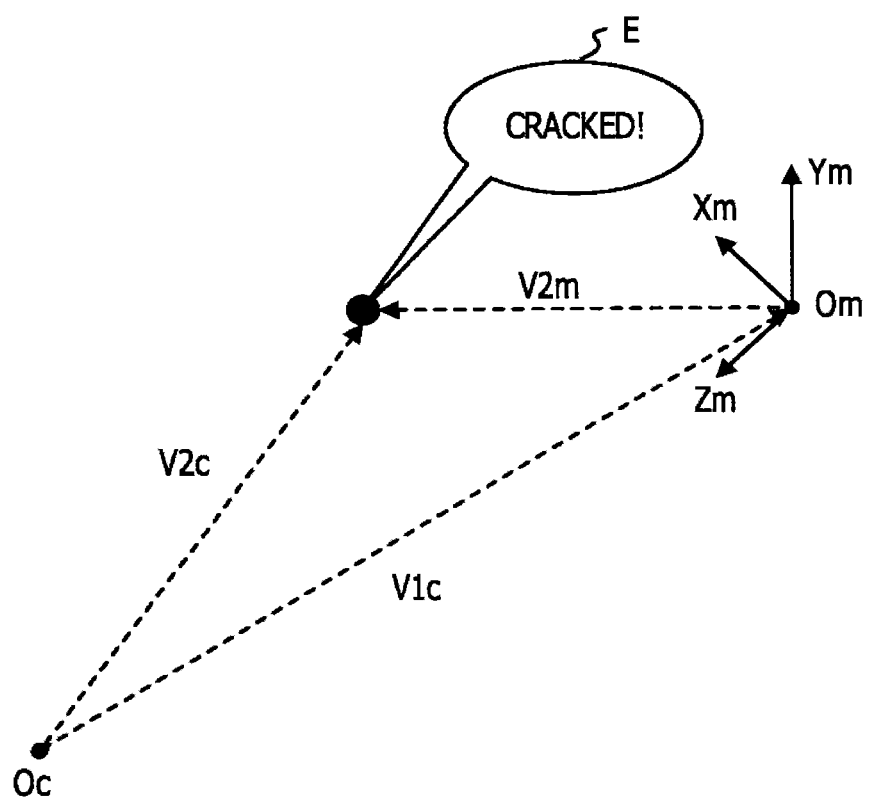
FIG. 2 illustrates an example of content in the camera coordinate system and the marker coordinate system.

FIG. 2 illustrates an example of content E in the camera coordinate system and the marker coordinate system. The content E illustrated in FIG. 2 is a callout-shaped object and includes text data "cracked!" in the callout. A black dot indicated by the callout of the content E represents a reference point of the content E. The coordinates of the reference point in the marker coordinate system are represented by V2m (X2m, Y2m, Z2m).

In addition, the orientation of the content E is defined by rotation coordinates G2m (P2m, Q2m, R2m), and the size of the content E is defined by a magnification D (Jx, Jy, Jz). The rotation coordinates G2m of the content E indicate the degree of rotation of the content E with respect to the marker coordinate system when the content E is arranged. For example, when the rotation coordinates G2m are (0, 0, 0), the content E is displayed parallel to the marker M in an AR manner.

The coordinates of points that constitute the content E are coordinates obtained by adjusting the coordinates of points defined in definition data (an AR template), which is an object template, based on the coordinates V2m of the reference point, the rotation coordinates G2m, and the magnification D. In the AR template, the coordinates of individual points are defined with the coordinates of the reference point being set to (0, 0, 0).

Thereafter, when the reference point V2m of content employing the AR template is set, the coordinates of individual points that constitute the AR template are moved in parallel, based on the coordinates V2m. The individual coordinates included in the AR template are rotated based on the set rotation coordinates G2m and are scaled by the magnification D. That is, the content E illustrated in FIG. 2 indicates a state in which the points defined in the AR template are constituted based on points adjusted based on the coordinates V2m of the reference point, the rotation coordinates G2m, and the magnification D.

The coordinates of the points of the content E, the coordinates being set in the marker coordinate system, are transformed into the camera coordinate system, and a position on a screen is calculated based on the coordinates in the camera coordinate system, to thereby generate an image for superimposition display of the content E.

The coordinates of the points included in the content E in the camera coordinate system are calculated by performing coordinate transformation (model-view transformation) on the coordinates of the points in the marker coordinate system, based on the coordinates V1c at the origin Om of the marker M in the camera coordinate system and the rotation coordinates G1c in the marker coordinate system with respect to the camera coordinate system. For example, the model-view transformation is performed on the reference point V2m of the content E to thereby determine to which point V2c (X2c, Y2c, Z2c) in the camera coordinate system the reference point specified in the marker coordinate system corresponds.

FIG. 3 depicts a transformation matrix M for transformation from the marker coordinate system into the camera coordinate system and a rotation matrix R in the transformation matrix M. The transformation matrix M is a 4×4 matrix. A product of the transformation matrix M and a column vector (Xm, Ym, Zm, 1) for coordinates Vm in the marker coordinate system is determined to obtain a column vector (Xc, Yc, Zc, 1) for corresponding coordinates Vc in the camera coordinate system.

That is, point coordinates in the marker coordinate system that are to be subjected to the coordinate transformation (model-view transformation) are substituted into the column vector (Xm, Ym, Zm, 1), and matrix computation is performed to thereby obtain the column vector (Xc, Yc, Zc, 1) including point coordinates in the camera coordinate system.

The rotation matrix R, that is, a submatrix in the first to third rows and the first to third columns, of the transformation matrix M acts on the coordinates in the marker coordinate system to thereby perform a rotation operation for matching the orientation of the marker coordinate system and the orientation of the camera coordinate system. A submatrix in the first to third rows and the fourth column of the transformation matrix M acts to thereby perform a translation operation for matching the orientation of the marker coordinate system and the position of the camera coordinate system.

FIG. 4 depicts rotation matrices R1, R2, and R3. The rotation matrix R illustrated in FIG. 3 is determined by a product (R1·R2·R3) of the rotation matrices R1, R2, and R3. The rotation matrix R1 indicates rotation of the axis Xm relative to the axis Xc. The rotation matrix R2 indicates rotation of the axis Ym relative to the axis Yc. The rotation matrix R3 indicates rotation of the axis Zm relative to the axis Zc.

The rotation matrices R1, R2, and R3 are generated based on a reference-item image in a captured image. That is, the rotation angles P1c, Q1c, and R1c are calculated based on as what image the reference item having a known shape is captured in a captured image to be processed, as described above. The rotation matrices R1, R2, and R3 are generated based on the calculated rotation angles P1c, Q1c, and R1c. The coordinates (Xc, Yc, Zc) obtained by the model-view transformation indicate a relative position of the content E from the virtual camera, for a case in which the virtual camera is assumed to exist in the virtual space.

In this case, when a virtual camera that captures an image of the virtual space from an overhead perspective is set, the rotation angles P1c, Q1c, and R1c are calculated based on a reference-item image in the captured image, and then −90 (degrees) is added to the value of each rotation angle P1c. The value of P1c to which −90 is added is used to generate the rotation matrix R. Hence, the coordinates (Xc, Yc, Zc) obtained based on the rotation matrix R have coordinate values in which the setting of the virtual camera is reflected. In the example in FIG. 1, however, since the origin of the camera coordinates is set to the focal point of the camera in the real space, and the virtual camera is set at a position equivalent to that of the camera in the real space, the coordinates (Xc, Yc, Zc) obtained based on the rotation matrix R indicate a relative position from the focal point of the camera in the real space.

Next, the coordinates of the points of the content E in the camera coordinate system are transformed into a screen coordinate system. The screen coordinate system is constituted by two dimensions (Xs, Ys). The screen coordinate system (Xs, Ys) has its origin Os, for example, at the center of a captured image acquired in image-capture processing performed by the camera. Based on the coordinates of points in the screen coordinate system that are obtained by the coordinate transformation (perspective transformation), an image for superimposition display of the content E on the captured image is generated.

The coordinate transformation (perspective transformation) from the camera coordinate system into the screen coordinate system is performed, for example, based on the focal length f of the camera. The coordinate Xs of the coordinates in the screen coordinate system that correspond to the coordinates (Xc, Yc, Zc) in the camera coordinate system is determined by equation 1 below. The coordinate Ys of the coordinates in the screen coordinate system that correspond to the coordinates (Xc, Yc, Zc) in the camera coordinate system is determined by equation 2 below.

$$Xs = f \cdot Xc/Zc \quad \text{(equation 1)}$$

$$Ys = f \cdot Yc/Zc \quad \text{(equation 2)}$$

An image of the content E is generated based on the coordinates (the screen coordinate system) obtained via the perspective transformation of the coordinates (the camera coordinate system) of points that constitute the content E. The content E is generated by mapping a texture to a face obtained by interpolating the points that constitute the content E. The AR template that serves as a base for the content E defines which points are to be interpolated to form a face and to which face a particular texture is to be mapped.

As a result of the above-described model-view transformation and perspective transformation, coordinates on the captured image that correspond to coordinates in the marker coordinate system are calculated, and the calculated coordinates are used to generate an image of the content E which corresponds to the point of view of the camera. The generated image of the content E is referred to as a "projected image of the content E". As a result of combination of the projected image of the content E with the captured image, visual information to be presented to a user of the information processing apparatus 1 is augmented.

In another example, the projected image of the content E is displayed on a transmissive display. In this example, since an image in the real space that the user obtains through a display and the projected image of the content E also match each other, visual information to be presented to the user is augmented.

Figure 5:
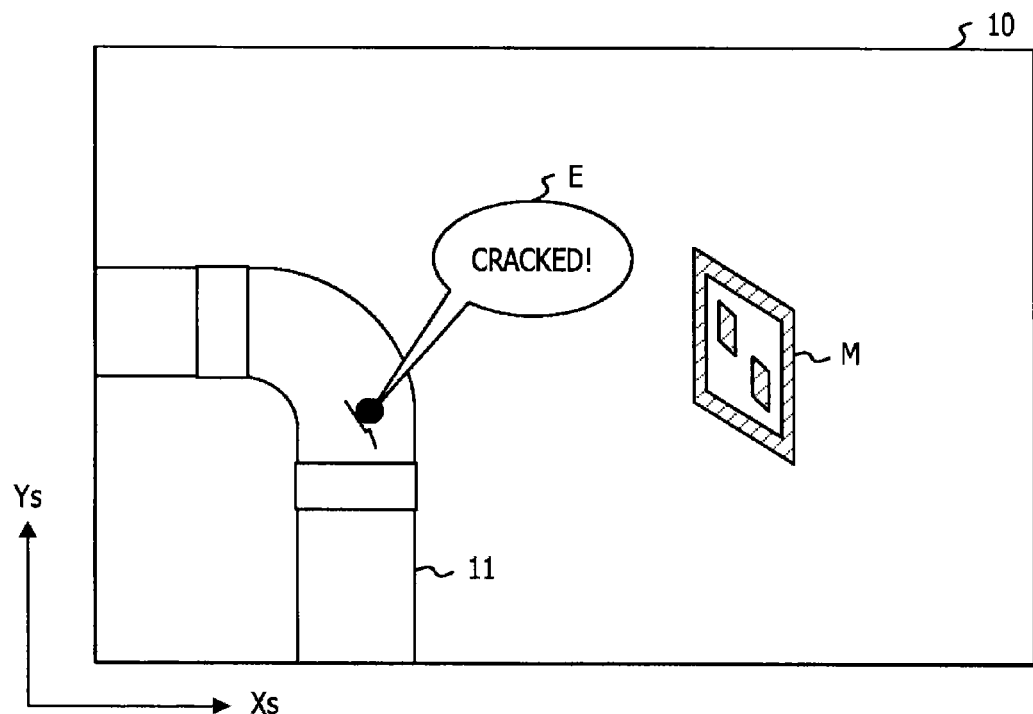
FIG. 5 illustrates an example of a composite image.

FIG. 5 illustrates an example of a composite image 10. In the composite image 10, a projected image of the content E is displayed superimposed on an input image resulting from image capture of the real space in which a pipe 11 and the marker M exist. The content E indicates information "cracked!" pointing at a crack on the pipe 11. That is, by capturing an image of the marker M, the user of the information processing apparatus 1 can view, via the composite image 10, the content E that does not exist in the real space and can easily recognize the presence of the crack.

The above description has been given of the generation of a composite image in which AR content is projected and displayed. As in the manner described above, in related art, the information processing apparatus sequentially obtains input images from the camera, and upon recognizing a reference item (marker) in an image to be processed, the information processing apparatus generates a composite image in which a projected image of content is displayed superimposed on the input image. Hence, during execution of some type of operation on a composite image, the user has been compelled to hold the information processing apparatus so that the composite image is continuously displayed and so that the marker recognition in the information processing apparatus can be continued.

Accordingly, an information processing apparatus according to the present disclosure switches between a first mode and a second mode at a predetermined timing. The first mode is a mode in which images sequentially obtained from an image capture device are stored in a storage area, and when a reference item is recognized in a newly obtained first image, display data corresponding to the reference item is displayed superimposed on the first image. The second mode is a mode in which, when a particular operation on the information processing apparatus is detected, a second image stored in the storage unit before the detection of the particular operation is obtained, and the display data is displayed superimposed on the second image. That is, when a particular operation is detected, AR display is executed on a particular past image, not on a sequentially obtained image.

First Embodiment

Figure 6:
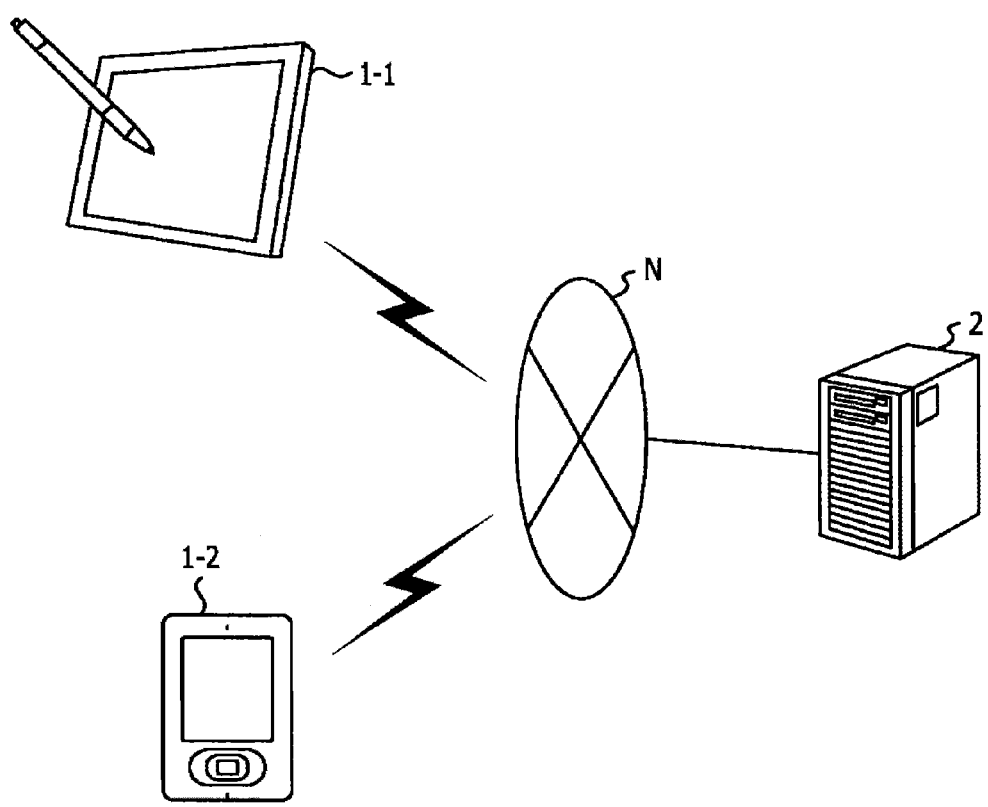
FIG. 6 is a schematic view of a system configuration according to a first embodiment.

First, a description will be given of detailed processing, the configuration of the information processing apparatus, and so on according to a first embodiment. FIG. 6 is a schematic view of a system configuration according to the first embodiment. This system includes communications terminals 1-1 and 1-2 and a management apparatus 2. The communications terminals 1-1 and 1-2 are collectively referred to as "information processing apparatuses 1".

Each information processing apparatus 1 is, for example, a computer, such as a tablet PC or a smartphone, equipped with a camera. For example, the information processing apparatus 1 is carried by an operator who carries out inspection work. The information processing apparatus 1 executes the first mode and the second mode. The information processing apparatus 1 communicates with the management apparatus 2 through a network N. The network N is, for example, the Internet.

The management apparatus 2 is, for example, a server computer and manages the information processing apparatuses 1. The management apparatus 2 stores information (content information and template information) used for generating composite images, and also provides the information processing apparatuses 1 with the information, as appropriate. Details of the processing are described later.

Upon recognizing a reference item in an input image, each information processing apparatus 1 generates a composite image, based on information used to generate the composite image, and also displays the generated composite image on a display. In addition, the input image in which the reference item is recognized is held in a buffer (an image storage unit described below) in the information processing apparatus 1 for at least a certain period of time. Upon detecting a particular operation, the information processing apparatus 1 switches the mode from the first mode to the second mode. In the second mode, the information processing apparatus 1 uses an image stored in the buffer in the past, not the latest image that is sequentially obtained, to generate a composite image.

In the present embodiment, the particular operation is, for example, an operation of tilting the information processing apparatus 1 performed by the user who holds the information processing apparatus 1. A specific scheme for the information processing apparatus 1 to detect a particular operation is described later.

Thus, for example, when the user captures an image of a marker with the camera, the information processing apparatus 1 generates and displays a composite image in the first mode. When the user desires to view the composite image for a long time or desires to perform an operation on the composite image, he or she tilts the information processing apparatus 1. When the information processing apparatus 1 is tilted, it switches the mode from the first mode to the second mode. Thus, even when a reference item is not recognizable in the latest image of input images, the information processing apparatus 1 can display a composite image based on a past image.

Figure 7:
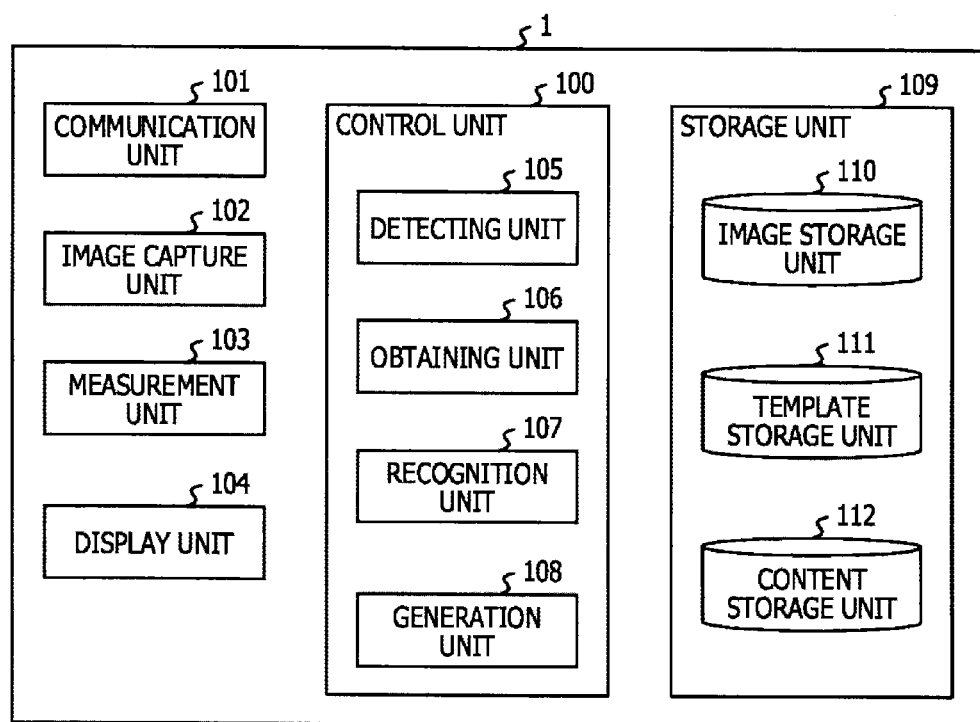
FIG. 7 is a functional block diagram of an information processing apparatus according to the first embodiment.

Next, a description will be given of the functional configuration of the information processing apparatus 1. FIG. 7 is a functional block diagram of the information processing apparatus 1 according to the first embodiment. The information processing apparatus 1 includes a control unit 100, a communication unit 101, an image capture unit 102, a measurement unit 103, a display unit 104, and a storage unit 109.

The control unit 100 controls various types of processing in the entire information processing apparatus 1. The communication unit 101 communicates with another computer. For example, in order to generate a composite image, the communication unit 101 receives the content information and the template information from the management apparatus 2. Details of the content information and the template information are described later.

The image capture unit 102 captures images at regular frame intervals and also outputs the captured images to the control unit 100 as input images. For example, the image capture unit 102 is a camera.

The measurement unit 103 measures information concerning the amount of rotation applied to the information processing apparatus 1. For example, the measurement unit 103 includes an acceleration sensor and a gyro-sensor. The measurement unit 103 measures an acceleration and an angular velocity as the information concerning the amount of rotation. Measurement values (the acceleration and the angular velocity) are output to a detecting unit 105 in the control unit 100.

The display unit 104 displays a composite image and other images. The display unit 104 is, for example, a touch panel display. The storage unit 109 stores therein information used for various types of processing. Methods involved in the various types of processing are described later.

First, a description will be given of the control unit 100. In addition to the aforementioned detecting unit 105, the control unit 100 has an obtaining unit 106, a recognition unit 107, and a generation unit 108. Based on the measurement values output from the measurement unit 103, the detecting unit 105 detects a particular operation on the information processing apparatus 1. Based on the result of the detection, the detecting unit 105 controls the mode to be executed by the information processing apparatus 1.

More specifically, based on the measurement values, the detecting unit 105 calculates an amount of rotation in the predetermined time (T seconds). In this case, the acceleration and the angular velocity, which are used to determine the amount of rotation in a predetermined time, may also be compared with thresholds. When the amount of rotation is larger than or equal to a threshold Th, the detecting unit 105 detects a rotation operation on the information processing apparatus 1. T is, for example, 1 second, and Th is, for example, 60 degrees.

The detecting unit 105 controls execution of the first mode, until it detects a particular operation. On the other hand, upon detecting a particular operation, the detecting unit 105 controls execution of the second mode. The first mode is a mode in which processing for generating a composite image is performed on an image newly captured by the image capture unit 102. The "newly captured image" as used herein refers to an image that is most recently stored among images stored in an image storage unit 110 (the aforementioned buffer) included in the storage unit 109.

On the other hand, the second mode is a mode in which processing for generating a composite image is performed on, of images stored in the image storage unit 110, an image captured before a particular operation is detected. For example, the processing for generating a composite image is performed on an image captured a predetermined time (T seconds) ago. The image on which the processing is performed may be an image acquired earlier than T seconds. When the image storage unit 110 is configured to hold images captured within the last T seconds, the processing in the second mode is performed on the oldest one of the images in the image storage unit 110.

The user first captures an image including a reference item and views a composite image. When the user desires to perform an operation, such as a selection operation, on the composite image, he or she tilts the information processing apparatus 1. For example, the user gives an amount of rotation of 60 degrees or more to the information processing apparatus 1 in one second. Thus, an image captured T seconds before the time when the particular operation was detected is highly likely to include a reference item. In other words, an image captured T seconds before the time when the particular operation was detected is an image on which the composite-image generation processing was performed in the first mode executed T seconds before.

In addition, when the mode is set to the second mode, the detecting unit 105 stops writing of image data to the image storage unit 110 (the aforementioned buffer). For example, while the set mode is the first mode, the control unit 100 stores image data in the image storage unit 110, each time an image is sequentially obtained from the image capture unit 102. However, the image data to be stored may be decimated at regular intervals. Also, when the image storage unit 110 is configured to hold a predetermined number of images, the oldest image data thereof is updated with the latest image data.

On the other hand, when the mode is set to the second mode, the detecting unit 105 stops storage of the image data in the image storage unit 110. The stopping is performed in order to hold, in the image storage unit 110, images to be processed as past images in the second mode. The detecting unit 105 may also stop the image capture performed by the image capture unit 102.

Next, the obtaining unit 106 obtains an image to be subjected to the composite-image generation processing. For example, when the set mode is the first mode, the obtaining unit 106 obtains the latest one of the images stored in the image storage unit 110. On the other hand, when the set mode is the second mode, the obtaining unit 106 obtains the oldest one of the images stored in the image storage unit 110.

Next, the recognition unit 107 recognizes a reference item in the image to be processed. In the present embodiment, the recognition unit 107 recognizes a marker. For example, the recognition unit 107 recognizes a marker by performing template matching using templates that specify the shapes of markers. Another known object-recognition method may also be used to recognize the marker.

In addition, upon recognizing that a reference item is included in the image, the recognition unit 107 obtains identification information for identifying the reference item. The identification information is, for example, a marker ID for identifying the marker. For example, when the reference item is a marker, a unique marker ID is obtained based on a white and black arrangement, as in a two-dimensional barcode. Another known obtaining method may also be used to obtain the marker ID.

Upon recognizing a reference item, the recognition unit 107 determines position coordinates and rotation coordinates of the reference item, based on a reference-item image in the obtained image. The position coordinates and the rotation coordinates of the reference item are values in the camera coordinate system. The recognition unit 107 further generates a transformation matrix M, based on the position coordinates and the rotation coordinates of the reference item.

The generation unit 108 generates a composite image by using the image to be processed. For generating the composite image, the generation unit 108 utilizes the transformation matrix M generated by the recognition unit 107, the template information, and the content information. The generation unit 108 controls the display unit 104 to display the generated composite image.

Next, a description will be given of the storage unit 109. The storage unit 109 has a template storage unit 111 and a content storage unit 112, in addition to the image storage unit 110. The image storage unit 110 stores therein image data for images captured in at least the last T seconds while the set mode is the first mode.

Figure 8:
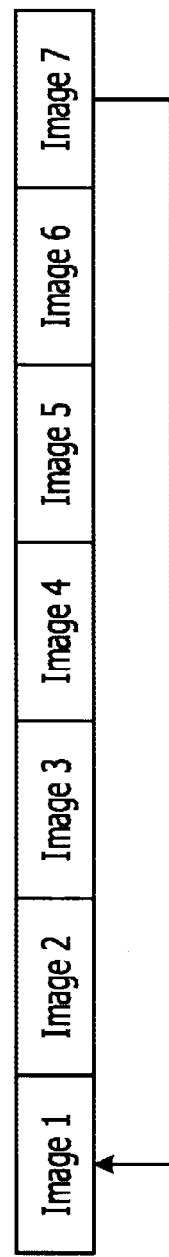
FIG. 8 illustrates an example data structure of an image storage unit.

FIG. 8 illustrates an example data structure of the image storage unit 110. It is assumed that the frame rate of the image capture unit 102 is 20 fps, and that storage of image data in the image storage unit 110 is executed every four frames. It is also assumed that the detecting unit 105 detects a particular operation based on the amount of rotation in one second (T seconds).

The image storage unit 110 stores therein a latest image 1, an image 2 acquired 0.2 second ago, an image 3 acquired 0.4 second ago, an image 4 acquired 0.6 second ago, an image 5 acquired 0.8 second ago, and an image 6 acquired 1.0 second ago. The image storage unit 110 may also store therein an image 7 acquired 1.2 seconds ago as an auxiliary image.

As illustrated in FIG. 8, the image storage unit 110 has a region for storing a predetermined number of images. In the example in FIG. 8, image data for seven images, namely, image data for the six images, including the latest image 1 to the image 6 acquired T seconds ago, and image data for the auxiliary image 7, are held. The image storage unit 110 is implemented by, for example, a ring buffer. When a new image is input from the image capture unit 102, data for the oldest image is overwritten with data for a new image every four frames.

During execution of the first mode, the latest image 1 is overwritten, and the overwritten image 1 is processed. On the other hand, in the second mode, writing of an image to the image storage unit 110 is stopped. Thus, the image 6 captured T seconds before the time when the mode is set to the second mode is not overwritten, and the same image 6 is processed while the set mode is the second mode.

FIG. 9 illustrates an example data structure of the template storage unit 111. The template storage unit 111 stores therein template information. The template information contains information for defining templates used as objects. The template information includes identification information (template IDs) of templates, coordinate information T21 of vertices constituting the templates, and configuration information T22 (vertex orders and designation of texture IDs) of faces that constitute the templates).

Each vertex order indicates the order of vertices that constitute a face. Each texture ID indicates the identification information of a texture mapped to the corresponding face. A reference point in each template is, for example, a zeroth vertex. The information indicated in the template information table defines the shape and patterns of a three-dimensional model.

FIG. 10 illustrates an example data structure of the content storage unit 112. The content storage unit 112 stores therein content information regarding content. The content is information obtained by setting arrangement information for an object.

The content information includes the content ID of the content, the position coordinates $(Xm, Ym, Zm)$ of a reference point in the marker coordinate system, the rotation coordinates $(Pm, Qm, Rm)$ in the marker coordinate system, the magnification D $(Jx, Jy, Jz)$ with reference to the AR templates, the template IDs of the AR templates, the marker IDs, and additional information. The position coordinates and the rotation coordinates are coordinates in the marker coordinate system with reference to the marker indicated by the marker ID stored in the same record. The additional information is information added to the content E. For example, access information for access to text, a web page, or a file is used as the additional information.

For example, the content (illustrated in FIG. 10) having a content ID "C1" is constituted by vertices obtained by scaling corresponding vertex coordinates, defined in the AR template "T1", in the directions Xm, Ym, and Zm, rotating the resulting vertex coordinates by using rotation coordinates $(Pm1, Qm1, Rm1)$, and translating the resulting vertex coordinates in accordance with position coordinates $(Xm1, Ym1, Zm1)$. In addition, the additional information is mapped to faces constituting the content E.

For instance, in the example in FIG. 10, additional information "Perform one of the operations to call the manual. Flick up: Manual for work A, Flick down: Manual for work B" is associated with the content ID "C1". This additional information indicates details of an instruction to the user. For example, by viewing the content including the additional information, the user can recognize next work.

Figure 11:
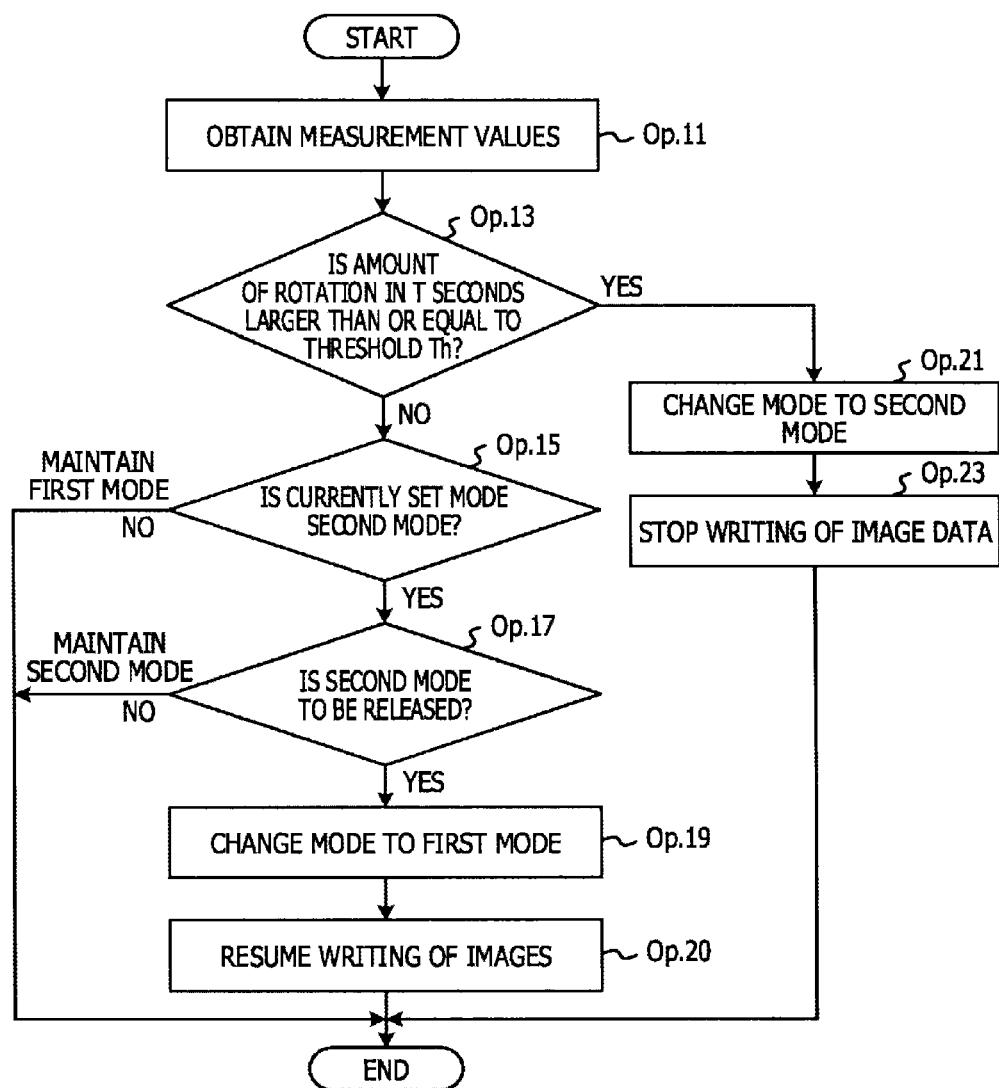
FIG. 11 illustrates a flow of mode-control processing according to the first embodiment.

Next, a description will be given of a flow of various types of processing according to the present embodiment. FIG. 11 illustrates a flow of mode-control processing according to the first embodiment. A mode control program is a program that defines a procedure of mode-control processing executed by the control unit 100. First, when the mode control program is launched, the control unit 100 executes preprocessing. In the preprocessing, the control unit 100 starts up the measurement unit 103 and also sets the mode to the first mode.

The detecting unit 105 obtains measurement values from the measurement unit 103 (Op.11). Based on the measurement values, the detecting unit 105 computes an amount of rotation in T seconds and also determines whether or not the amount of rotation is larger than or equal to the threshold Th (Op.13). If the amount of rotation is larger than or equal to the threshold Th (YES in Op.13), the detecting unit 105 changes the mode from the first mode to the second mode (Op.21). The detecting unit 105 also stops writing of image data to the image storage unit 110 (Op.23).

On the other hand, if the amount of rotation is smaller than the threshold Th (NO in Op.13), the detecting unit 105 determines whether or not the currently set mode is the second mode (Op.15). If the set mode is not the second mode (NO in Op.15), the detecting unit 105 finishes the processing.

On the other hand, if the currently set mode is the second mode (YES in Op.15), the detecting unit 105 determines whether or not an input for releasing the second mode is performed (Op.17). For example, if the user performs an input for releasing the second mode, or if the amount of rotation that is larger than or equal to the threshold Th is measured in T seconds, as in Op.13, it is determined that an input for releasing the second mode is performed.

If an input for releasing the second mode is performed (YES in Op.17), the detecting unit 105 releases the second mode and sets the mode to the first mode (Op.19). The detecting unit 105 then resumes the writing of images to the image storage unit 110 (Op.20). On the other hand, if an input for releasing the second mode is not performed (NO in Op.17), the detecting unit 105 finishes the processing. That is, after the mode is set to the second mode, the second mode is continued until the second mode is released.

Figure 12:
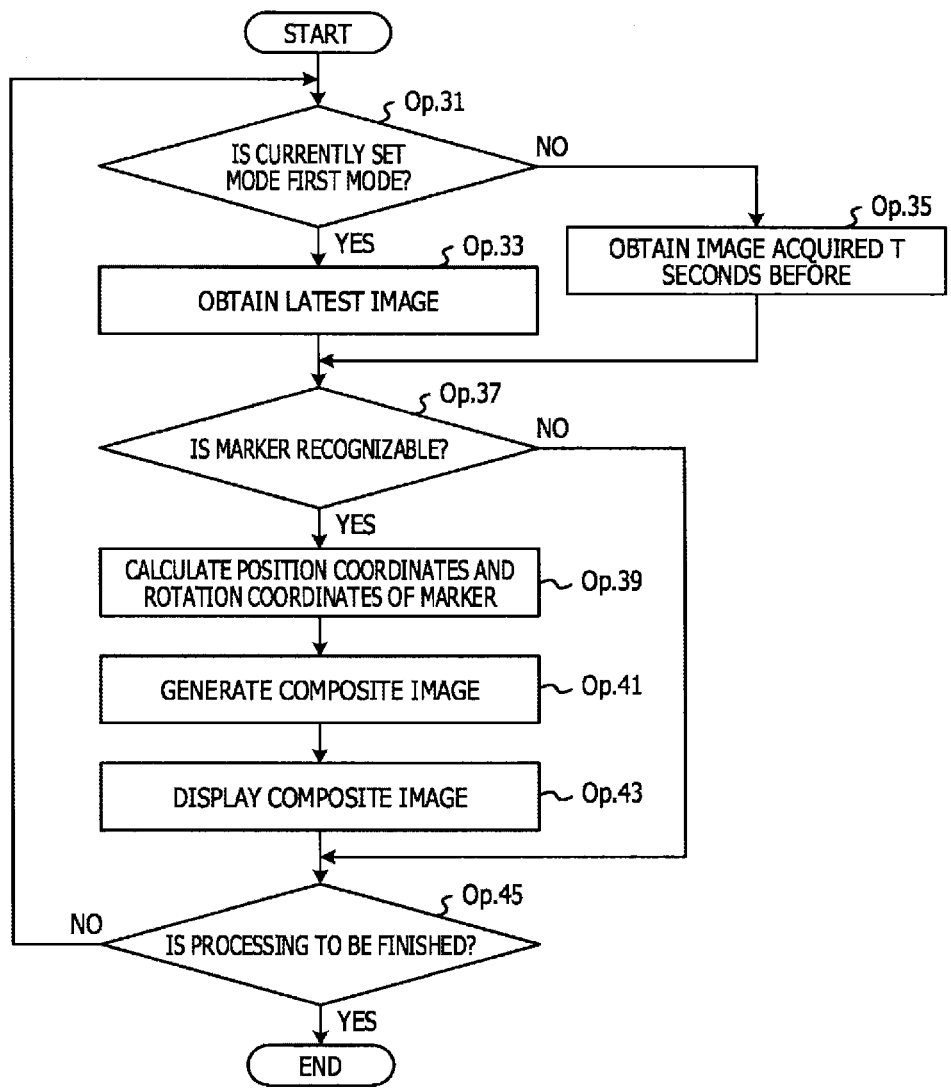
FIG. 12 is a flowchart of composite-image generation processing according to the first embodiment.

Next, a description will be given of composite-image generation processing that is performed in parallel with the mode-control processing. FIG. 12 is a flowchart of composite-image generation processing according to the first embodiment. First, when the composite-image generation program is launched, the control unit 100 performs preprocessing. In the preprocessing, the template information and the content information are obtained from the management apparatus 2. In the preprocessing, the control unit 100 further issues an instruction for starting an AR display mode. In the present embodiment, a camera having a line of sight that is substantially the same as that of a camera that exists in the real space is set as a virtual camera.

Also, in the preprocessing, the control unit 100 causes the image capture unit 102 to start image capture that is performed at predetermined time intervals. The control unit 100 stores images, obtained from the image capture unit 102, in the image storage unit 110. However, when the image writing is stopped upon execution of the second mode, the control unit 100 does not store the images in the image storage unit 110.

First, the obtaining unit 106 determines whether or not the currently set mode is the first mode (Op.31). If the currently set mode is the first mode (YES in Op.31), the obtaining unit 106 obtains a latest image from the image storage unit 110 (Op.33). On the other hand, if the currently set mode is not the first mode, that is, the currently set mode is the second mode (NO in Op.31), the obtaining unit 106 obtains, from the image storage unit 110, an image acquired T seconds before the time when the particular operation was obtained (Op.35). The image obtained in Op.33 or Op.35 serves as an image to be processed in subsequent processing.

Next, the recognition unit 107 determines whether or not a marker is recognizable in the image to be processed (Op.37). For example, the recognition unit 107 recognizes a marker by performing template matching using templates that specify the shapes of markers.

If a marker is recognized, the recognition unit 107 reads the marker ID of the marker in Op.37. The marker ID is read, for example, based on information of brightness in an image region corresponding to the marker. For example, when the marker has a square shape, a determination is made in a predetermined order as to whether each of multiple regions obtained by dividing a square image region recognized as a marker is "1" or "0", where "1" indicates a region whose brightness is larger than or equal to a predetermined value, and "0" indicates a region whose brightness is smaller than the predetermined value. Then, a series of information resulting from the determination is used as the marker ID.

Also, for example, arrangements in regions in which the brightness is larger than or equal to the predetermined value and regions in which the brightness is smaller than the predetermined value in the frame of the square may be patterned, and a marker ID corresponding to a pattern may be used. In addition, the range of numerical values used for the marker ID may be determined in advance, and when the read marker ID is not in the range of numerical values, it may be determined that the reading of the marker ID has failed.

If the recognition unit 107 fails to recognize a marker (NO in Op.37), the control unit 100 determines whether or not an instruction for finishing the composite-image generation processing is issued (Op.45). If the recognition unit 107 does not recognize a marker in a state in which the set mode is the second mode (NO in Op.37), the control unit 100 may also determine whether or not a marker is recognizable in another image stored in the image storage unit 110. For example, the obtaining unit 106 may obtain, as an image to be processed, an image that is acquired earlier than T seconds from the time when the particular operation was detected. Then, the recognition unit 107 may perform marker recognition processing on the image to be processed.

If an instruction for finishing the composite-image generation processing is not issued (NO in Op.45), the control unit 100 returns to Op.31. If an instruction for finishing the composite-image generation processing is issued (YES in Op.45), the series of processes in the composite-image generation processing ends.

On the other hand, if the recognition unit 107 recognizes a marker (YES in Op.37), the recognition unit 107 calculates the position coordinates and the rotation coordinates of the marker, based on a marker image in the image to be processed (Op.39). In addition, in Op.39, the recognition unit 107 generates a transformation matrix M, based on the position coordinates and the rotation coordinates of the marker.

Next, the generation unit 108 generates a composite image by using the image to be processed, the content information for the recognized reference item, the template information, and the transformation matrix M (Op.41). Under the control of the generation unit 108, the display unit 104 displays the composite image (Op.43). The control unit 100 then executes Op.45.

While the set mode is the first mode, the composite image is an image in which a projected image of content is displayed superimposed on the latest image. On the other hand, while the set mode is the second mode, the composite image is an image in which a projected image of the content is displayed superimposed on an image acquired T seconds ago. That is, a composite image based on an image that was acquired T seconds ago and that is highly likely to include a reference item is displayed on the display unit 104.

As described above, according to the present embodiment, when the information processing apparatus 1 detects that the user has executed a particular operation, the content is displayed superimposed on an image captured before the user performed the particular operation. Thus, switching is performed between the AR display (the first mode) on the latest image and the AR display (the second mode) on the past image, and the AR display on the past image is continued unless the second mode is released. This allows the user to perform various operations on the AR display that is continued in the second mode.

In the present embodiment, upon being triggered by a user operation for rotating the information processing apparatus 1, the first mode and the second mode are switched. In the information processing apparatus 1, the camera is provided at the back side of its display (the display unit 104) sometimes. Thus, the use of the operation for rotating the information processing apparatus 1 as a trigger for switching between the first mode and the second mode allows the user to easily perform, after the operation, an operation on the display on which the composite image is displayed.

FIGS. 13A and 13B illustrate a relationship between the user's posture of holding the information processing apparatus and a load. FIGS. 13A and 13B illustrate a state in which the marker M is attached to a wall. In FIG. 13A, the user captures an image of the marker M by using the camera provided on the surface opposite to the surface of the display of the information processing apparatus 1. A composite image in which content corresponding to the marker M is displayed superimposed is displayed on the display of the information processing apparatus 1. The composite image includes of an image M' of the marker M.

FIG. 13B illustrates a case in which the user has rotated the information processing apparatus 1 in the state illustrated in FIG. 13A by 60 degrees or more. This makes it difficult for the camera of the information processing apparatus 1 to capture an image of the marker M. Meanwhile, the user can more stably support the information processing apparatus 1 with his or her left hand in FIG. 13B. This allows the user to easily perform an operation on the display with his or her right hand. In the related art, a composite image is not displayed in the state illustrated in FIG. 13B, thus the user typically has to consciously maintain the state illustrated in FIG. 13A.

In the present embodiment, after the user captures an image of the marker M with the information processing apparatus 1, the display state is switched to the AR display on a past image, upon being triggered by rotation of the information processing apparatus 1, as illustrated in FIG. 13B. That is, even when the user changes the state in which the load of supporting the information processing apparatus 1 is large, as in FIG. 13A, to the state in which the load is small, as in FIG. 13B, the information processing apparatus 1 can maintain the display of the composite image.

Second Embodiment

The description in the first embodiment has been given of the information processing apparatus 1 that switches between the first mode and the second mode upon detecting a particular operation. In a second embodiment, when the mode is switched to the second mode, additional content related to content is downloaded from the management apparatus 2. An information processing apparatus according to the second embodiment, is referred to as an "information processing apparatus 3".

Figure 14:
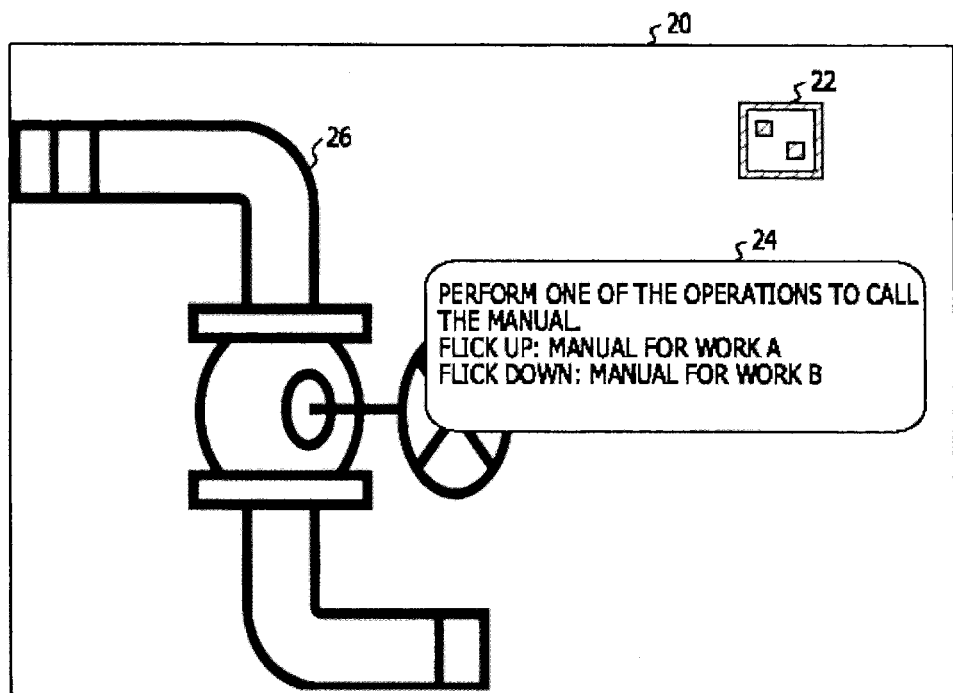
FIG. 14 illustrates an image for describing additional content.

FIG. 14 illustrates an image for describing additional content. A composite image 20 is an image in which content 24 is projected on an image obtained by capturing real space including a marker 22 and a valve 26. The content 24 includes text information indicating "Perform one of the operations to call the manual. Flick up: Manual for work A, Flick down: Manual for work B". Upon detecting a flick operation of the user, the information processing apparatus 3 newly displays the corresponding work manual as additional content in accordance with the operation.

Now, a description will be given of the timing at which data of additional content is obtained. The management apparatus 2 manages the additional content. The additional content may be, in many cases, data having a large amount of data, such as a manual, a moving image, and voice/sound. Thus, the additional content is displayed upon a flick operation of the user or the like, rather than being displayed simultaneously with the content 24. That is, the content 24 and the additional content are displayed in a stepwise manner.

For example, it is conceivable that the data of additional content is obtained from the management apparatus 2 in advance, as in the template information and the content information. In this case, however, additional data that is highly likely to be called by the user is also obtained from the management apparatus 2 in advance, so that, in particular, when the additional data has a large amount of data, communication load on the network N increases.

Accordingly, in the present embodiment, the information processing apparatus 3 obtains the data of the additional content from the management apparatus 2 at the timing when a particular operation performed by the user is detected. For example, when the user rotates the information processing apparatus 3 with the amount of rotation that is larger than or equal to the threshold in a certain period of time, the information processing apparatus 3 requests the management apparatus 2 to transmit the additional content. The mode switching is also executed, as in the first embodiment.

The additional content is called in response to a user operation on the content (the composite image). Thus, it can be presumed that, after the user performs a particular operation for switching the mode from the first mode to the second mode, there is a high possibility that the additional content is called in accordance with an operation on the content.

Thus, when the information processing apparatus 3 detects a particular operation and there is additional content for content included in the composite image, the information processing apparatus 3 obtains the additional content from the management apparatus 2. This makes it possible to inhibit an increase in the load on the network N, compared with a case in which the additional content is obtained from the management apparatus 2 in advance, as in the case of the template information and the content information.

Figure 15:
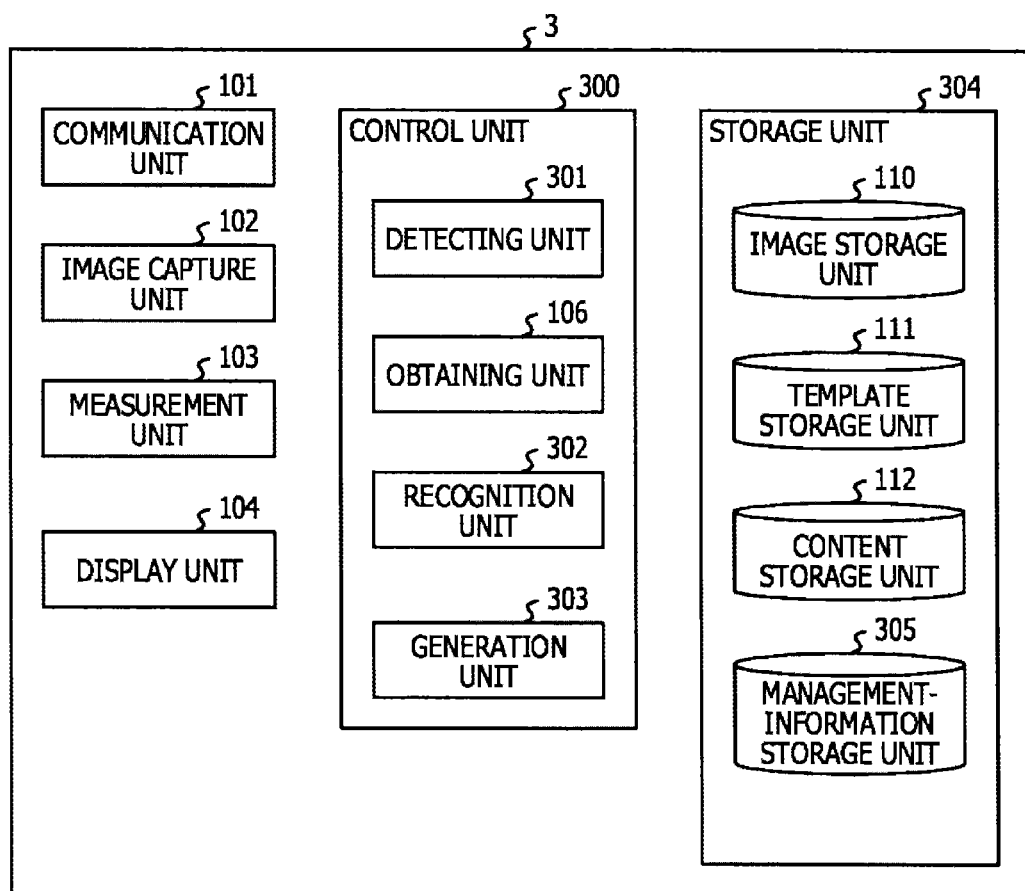
FIG. 15 is a functional block diagram of an information processing apparatus according to a second embodiment.

FIG. 15 is a functional block diagram of the information processing apparatus 3 according to the second embodiment. The information processing apparatus 3 includes a communication unit 101, an image capture unit 102, a measurement unit 103, a display unit 104, a control unit 300, and a storage unit 304. Processing units that perform processing that is the same as or similar to that performed by the processing units in the information processing apparatus 1 according to the first embodiment are denoted by the same reference numerals, and descriptions thereof are not given hereinafter.

The control unit 300 includes a detecting unit 301, an obtaining unit 106, a recognition unit 302, and a generation unit 303. The detecting unit 301 detects a particular operation, as in the first embodiment. Also, upon detecting a particular operation, the detecting unit 301 switches the mode from the first embodiment to the second mode, as in the first mode. In addition, when a particular operation is detected and additional content is associated with content in the composite image, the detecting unit 301 controls the communication unit 101 to request for the additional content. The correspondence relationship between the content and the additional content is defined by management information.

As in the first embodiment, the recognition unit 302 recognizes a reference item in an image to be processed. However, when the set mode is the second mode and a reference item is recognized in the image, the recognition unit 302 outputs the identification information (the marker ID) of the recognized reference item to the detecting unit 301.

As in the first embodiment, the generation unit 303 generates a composite image, based on the image to be processed. In addition, after the composite image is displayed, the generation unit 303 controls the display unit 104 to display the additional content in accordance with an operation performed by the user. For example, when the user inputs a down flick after the composite image 20 in FIG. 14 is displayed, the generation unit 303 controls the display unit 104 to display the work B manual.

The storage unit 304 includes an image storage unit 110, a template storage unit 111, a content storage unit 112, and a management-information storage unit 305. The management-information storage unit 305 stores management information therein. The management information is information for managing additional content for content and operations for calling the additional content.

The management-information storage unit 305 stores therein information of content IDs, operation types, additional content IDs, access destinations, and so on in association with each other.

FIG. 16 illustrates an example data structure of the management-information storage unit 305. For example, data in the management-information storage unit 305 specifies that, with respect to content with a content ID "C1", an additional content ID "SC1" is to be displayed when a "flick up" operation is input. The data in the management-information storage unit 305 further specifies that the additional content ID "SC1" is to be obtained from an access destination "URL1". The access destination is information indicating a location in which the management apparatus 2 stores data corresponding to the additional content ID "SC1".

For example, upon detecting a particular operation, the detecting unit 301 switches the mode to the second mode. In the second mode, the obtaining unit 106 obtains, from the image storage unit 110, an image acquired T seconds before the time when the particular operation was detected. Upon recognizing a marker in the image acquired T seconds ago, the recognition unit 302 outputs the marker ID of the recognized marker to the detecting unit 301.

The detecting unit 301 obtains a content ID corresponding to the marker ID from the content storage unit 112, and refers to the management-information storage unit 305 to control the communication unit 101 to access an access destination corresponding to the content ID. That is, the detecting unit 301 issues, to the management apparatus 2, a request for transmitting the additional content. As described above, when additional content is set for a reference item recognized in the second mode, the additional content is obtained from the management apparatus 2, after the mode is switched to the second mode.

Figure 17:
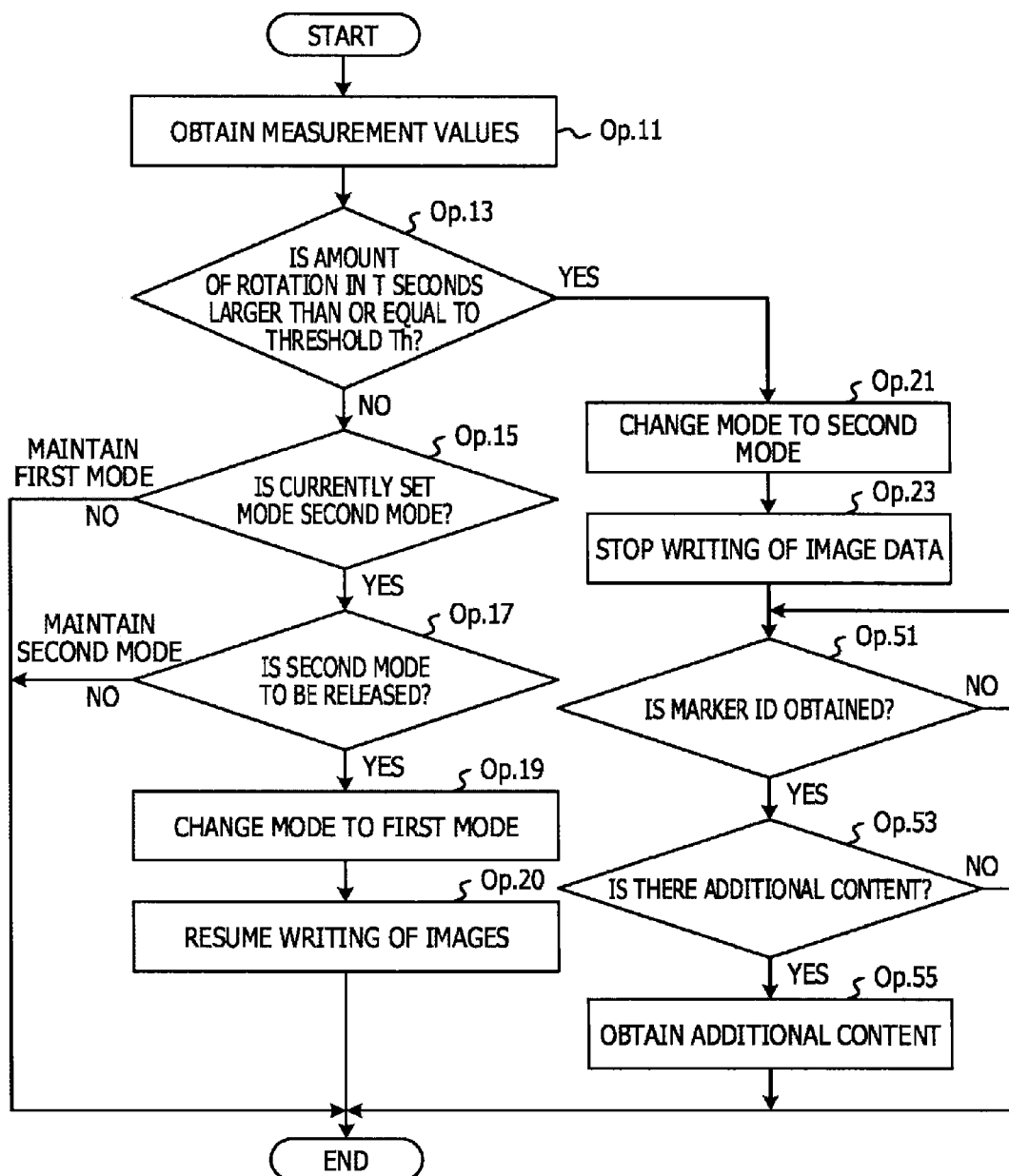
FIG. 17 illustrates a flow of mode-control processing according to the second embodiment.

Next, a description will be given of a flow of various types of processing according to the present embodiment. FIG. 17 illustrates a flow of mode-control processing according to the second embodiment. A mode control program is a program that defines a procedure of the mode-control processing to be executed by the control unit 300. Processes that are analogous to those in the mode-control processing according to the first embodiment are denoted by the same reference numbers, and descriptions thereof are not given hereinafter.

First, when the mode control program is launched, the control unit 300 executes preprocessing that is analogous to that in the first embodiment. The detecting unit 301 then obtains measurement values from the measurement unit 103 (Op.11). Based on the measurement values, the detecting unit 301 determines whether or not the amount of rotation is larger than or equal to the threshold Th (Op.13). If the amount of rotation is larger than or equal to the threshold Th (YES in Op.13), the detecting unit 301 changes the mode from the first mode to the second mode (Op.21). The detecting unit 301 also stops writing of image data to the image storage unit 110 (Op.23).

In addition, the detecting unit 301 determines whether or not a marker ID is obtained from the recognition unit 302 (Op.51). The detecting unit 301 waits until it obtains a marker ID (NO in Op.51). In composite-image generation processing described below, when the set mode is the second mode and a reference item is not recognized, a message may be output to the user so as to photograph a reference item again. The recognition unit 302 then outputs an instruction for releasing the second mode to the detecting unit 301. In this case, the detecting unit 301 releases the standby state in Op.51 and also releases the second mode.

If a marker ID is obtained (YES in Op.51), the detecting unit 301 determines whether or not there is additional content (Op.53). That is, by using the marker ID as a search key, the detecting unit 301 searches the content storage unit 112 to obtain a corresponding content ID. In addition, by using the obtained content ID as a search key, the detecting unit 301 searches the management-information storage unit 305 to identify a corresponding access destination for the additional content. In this case, when the corresponding content ID and the corresponding access destination are not found, it is determined that there is no additional content.

If there is additional content (YES in Op.53), the detecting unit 301 controls the communication unit 101 to obtain the additional content from the management apparatus 2 (Op.55). On the other hand, if there is no additional content (NO in Op.53), the control unit 300 ends the series of processes.

If the amount of rotation is smaller than the threshold Th (NO in Op.13), the detecting unit 301 determines whether or not the currently set mode is the second mode (Op.15), as in the first embodiment. If the currently set mode is not the second mode (NO in Op.15), the detecting unit 301 ends the processing.

On the other hand, if the currently set mode is the second mode (YES in Op.15), the detecting unit 301 determines whether or not an input for releasing the second mode is performed (Op.17). For example, if the user performs an input for releasing the second mode, if the amount of rotation that is larger than or equal to the threshold Th is measured in T seconds, or if an instruction for releasing the second mode is input from the recognition unit 302, it is determined that an input for releasing the second mode is performed.

If an input for releasing the second mode is performed (YES in Op.17), the detecting unit 301 releases the second mode and sets the mode to the first mode (Op.19). The detecting unit 301 then resumes the writing of images to the image storage unit 110 (Op.20). On the other hand, if an input for releasing the second mode is not performed (NO in Op.17), the detecting unit 301 ends the processing.

Figure 18:
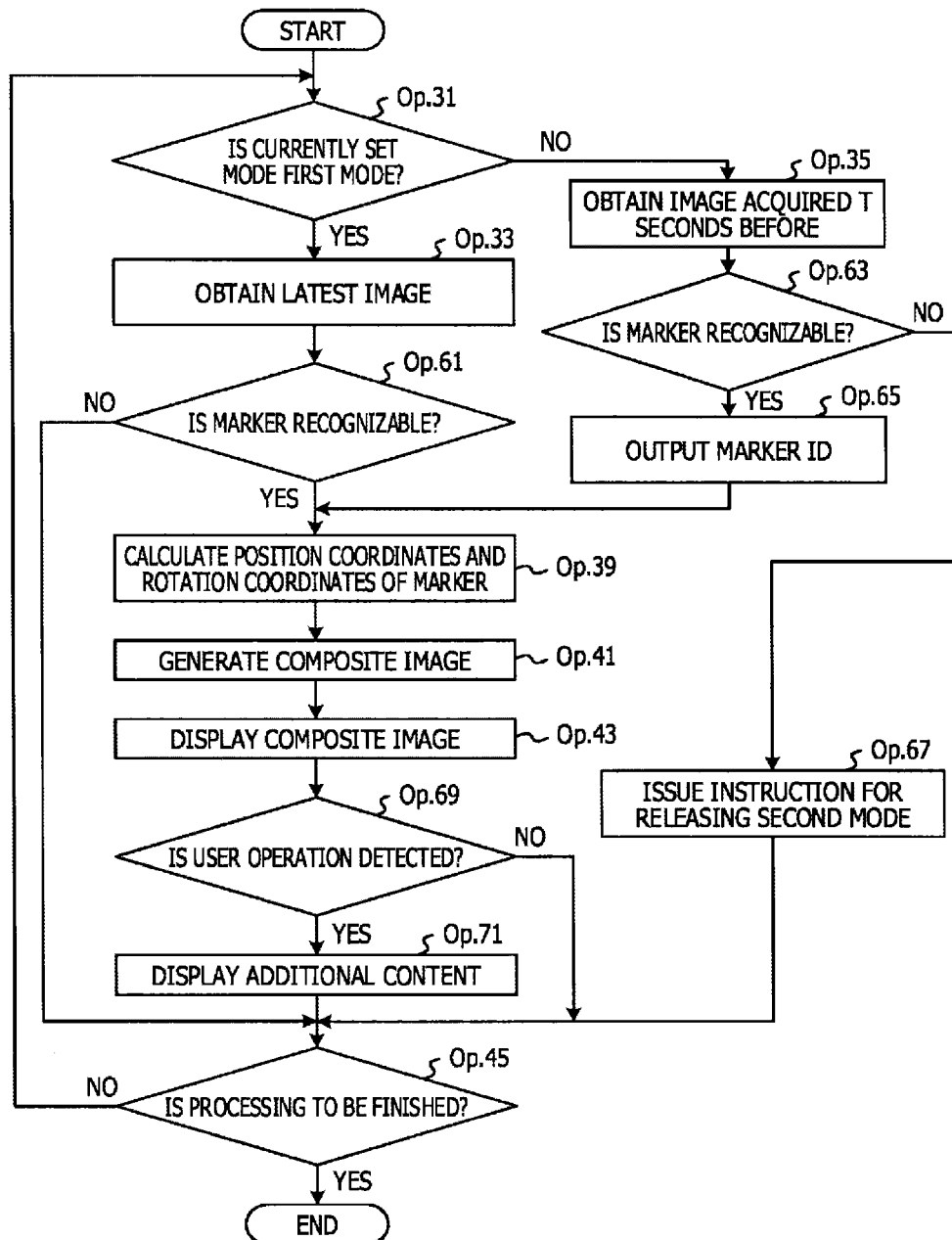
FIG. 18 is a flowchart of composite-image generation processing according to the second embodiment.

Next, a description will be given of composite-image generation processing according to the second embodiment, the processing being performed in parallel with the mode-control processing. FIG. 18 is a flowchart of the composite-image generation processing according to the second embodiment. Processes that are analogous to those in the composite-image generation processing according to the first embodiment are denoted by the same reference numerals, and descriptions thereof are given briefly.

First, when the composite-image generation program is launched, the control unit 300 performs preprocessing that is the same as or similar to that in the first embodiment. However, in the preprocessing, although the template information, the content information, and the management information are obtained from the management apparatus 2, the data of additional content is not obtained.

The obtaining unit 106 determines whether or not the currently set mode is the first mode (Op.31). If the currently set mode is the first mode (YES in Op.31), the obtaining unit 106 obtains a latest image from the image storage unit 110 (Op.33). The recognition unit 302 then determines whether or not a marker is recognizable in the latest image (Op.61). If a marker is recognizable (YES in Op.61), Op.39 is executed.

If the currently set mode is not the first mode, that is, the currently set mode is the second mode (NO in Op.31), the obtaining unit 106 obtains, from the image storage unit 110, an image acquired T seconds ago (Op.35). The recognition unit 302 then determines whether or not a marker is recognizable in the image acquired T seconds ago (Op.63). If a marker is recognizable (YES in Op.63), the recognition unit 302 outputs the marker ID of the recognized marker to the detecting unit 301 (Op.65). Thereafter, Op.39 is executed. The marker ID output in Op.65 is obtained by the detecting unit 301 in Op.51 in FIG. 17.

On the other hand, if no marker is recognizable (NO in Op.63), the recognition unit 302 issues an instruction for releasing the second mode to the detecting unit 301 (Op.67). The recognition unit 302 may also determine whether or not a marker is recognizable in another image stored in the image storage unit 110. The control unit 300 may also output, to the user via the display unit 104, a message indicating that an image of a marker is to be captured again.

In this case, if the detecting unit 301 obtains the releasing instruction, the standby state in which the detecting unit 301 waits for obtaining a marker ID in Op.51 is released, and the mode-control processing is temporarily finished. Thereafter, when the mode-control processing is resumed, the detecting unit 301 determines that the result in Op.17 FIG. 17 is affirmative and releases the second mode in Op.19.

Next, the recognition unit 302 calculates the position coordinates and the rotation coordinates of the marker, based on a marker image in the image to be processed (Op.39). The recognition unit 302 also generates a transformation matrix M, based on the rotation coordinates and the position coordinates of the marker.

Next, the generation unit 303 generates a composite image by using the content information for the recognized reference item, the template information, and the transformation matrix M (Op.41). Under the control of the generation unit 303, the display unit 104 displays the composite image (Op.43). The control unit 300 then determines whether or not a user operation on the composite image is input (Op.69). For example, when the display unit 104 is a touch panel, a flick operation and the direction of the flick operation are detected based on a change in touch positions that are input time-sequentially.

If a user operation is input (YES in Op.69), the display unit 104 displays additional content under the control of the generation unit 303 (Op.71). When the user performs an operation in the first mode, the additional content may also be obtained from the management apparatus 2 before Op.71 is performed, although this is predicated on the assumption that the user executes the operation after the mode is switched from the first mode to the second mode. In such a case, however, the additional content is not displayed until it is obtained from the management apparatus 2.

If the result in the determination in Op.61 is negative, if Op.67 is executed, if the result in the determination in Op.69 is negative, or if Op.71 is executed, the control unit 300 determines whether or not an instruction for finishing the processing is issued (Op.45). If an instruction for finishing the processing is not issued (NO in Op.45), the control unit 300 returns to Op.31. If an instruction for finishing the processing is issued (YES in Op.45), the series of processes in the composite-image generation processing ends.

As described above, the information processing apparatus 3 obtains additional content at the timing when the mode is switched to the second mode. That is, the information processing apparatus 3 assumes the user having switched the mode to the second mode as a prior stage of input of an operation on the content. In other words, when the content is associated with additional content, the information processing apparatus 3 assumes that there is a high possibility that the additional content is to be called by a subsequent user operation. Thus, the information processing apparatus 3 can reduce the load on a user operation on a composite image and can also control the download timing of additional content that is highly likely to be called upon an operation.

Third Embodiment

A third embodiment is the same as the first and second embodiments in that AR display on a past image is performed in the second mode. However, the setting of the virtual camera is switched between the first mode and the second mode. In the third embodiment, the virtual camera is set so as to have an overhead viewpoint in the second mode. That is, the display state of AR content in a composite image is switched from a normal view in the first mode to an overhead view in the second mode. An information processing apparatus according to the third embodiment is referred to as an "information processing apparatus 4".

More specifically, in the third embodiment, a projected image of content like an image obtained by capturing, from above, a virtual space in which content is virtually arranged is superimposed on an image to be processed, to thereby generate a composite image. However, since a captured image in the real space which serves as a base for the composite image is an image captured by a camera that exists in the real space, only the content is projected and displayed from an overhead viewpoint.

Figure 19A:
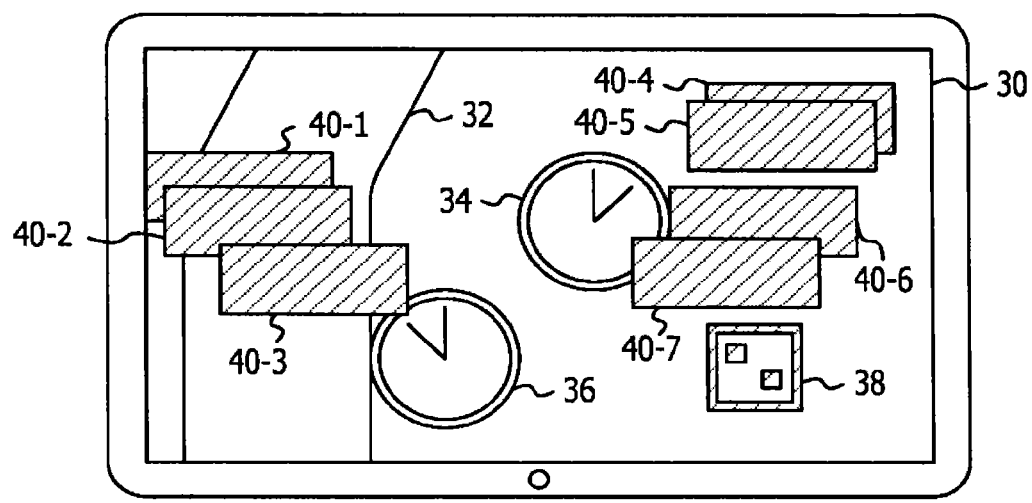
FIGS. 19A and 19B illustrate images for describing a third embodiment.
Figure 19B:
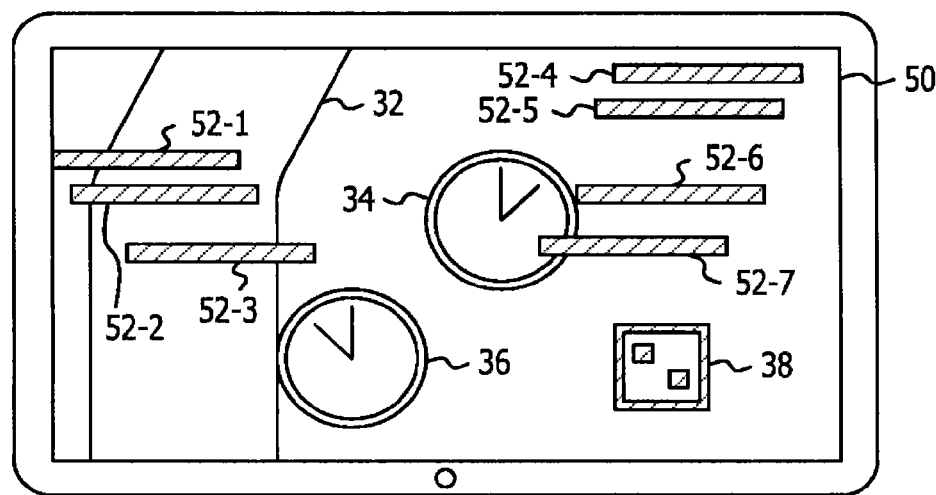

FIGS. 19A and 19B illustrate images for describing the third embodiment. More specifically, FIG. 19A illustrates a composite image 30 generated in the first mode. FIG. 19B illustrates a composite image 50 generated in the second mode.

As illustrated in FIG. 19A, the composite image 30 may include a plurality of pieces of content 40 for a marker 38. The content 40 is a general term of content 40-1, content 40-2, content 40-3, content 40-4, content 40-5, content 40-6, and content 40-7. The composite image 30 is an image obtained via superimposition display of the content 40 on a captured image in real space including a pipe 32, indicators 34 and 36, and the marker 38.

The multiple pieces of content 40 are arranged in the composite image 30 in an overlapping manner, and thus there are cases in which it is difficult for the user to view all of the pieces of content 40. For example, the information processing apparatus 4 may have a function for displaying, when the user designates any of multiple pieces of content, the designated content with a larger size or in the foreground. However, there are also cases in which it is difficult for the user to select any of the pieces of content in the composite image.

Accordingly, in the present embodiment, with respect to a composite image generated in the second mode, the position of the virtual camera is controlled to generate the composite image 50 in FIG. 19B. As in the case of the composite image 30, the composite image 50 is generated based on a captured image including the pipe 32, the indicators 34 and 36, and the marker 38. However, multiple pieces of content 52 are projected as if they were captured from above.

The content 52 is a general term of the content 52-1, the content 52-2, the content 52-3, the content 52-4, the content 52-5, the content 52-6, and the content 52-7. The content 52-1, the content 52-2, the content 52-3, the content 52-4, the content 52-5, the content 52-6, and the content 52-7 are the same as the content 40-1, the content 40-2, the content 40-3, the content 40-4, the content 40-5, the content 40-6, and the content 40-7, respectively, in the virtual space.

That is, although the multiple pieces of content 40 are displayed in the composite image 30 in an overlapping manner, the multiple pieces of content 52 are displayed in the composite image 50 without overlapping through control of the line of sight of the virtual camera.

For example, when the user views the composite image 30 and determines that it is difficult to perform a selection operation on the content 40 because of the overlapping of the content 40, he or she rotates the information processing apparatus 4. As a result, the mode is set to the second mode, so that the composite image 50 acquired by projecting the content 40 from another line of sight is displayed. The pieces of content 40, some of which overlapped each other from one line of sight, are displayed without the overlapping.

When the user selects any of the pieces of content 52 in the composite image 50, the selected content 52 is displayed in a normal view. For example, when the content 52-1 is selected, a projected image in the state of the content 40-1 is displayed. Thus, for example, when text is displayed in the content 52, the user causes the content 52 displayed in the overhead view to be displayed in the normal view, thereby making it possible to view the text displayed in the content 52.

In this case, typically, it is preferable that, in the authoring process, the content position coordinates (in the three-dimensions) be set so that pieces of content do not overlap each other. However, even if the content position coordinates (in the three-dimensions) are set so that the multiple pieces of content do not overlap each other, pieces of content may be displayed in an overlapping manner during actual execution of the AR display, depending on the position of the camera.

However, even if pieces of contents are displayed in an overlapping manner in projection from one line of sight, the overlapping is removed in projection from another line of sight, unless the same position coordinates are given in the authoring process. Thus, there is a high possibility that the overlapping of pieces of contents is removed when the mode is set to the second mode.

Figure 20:
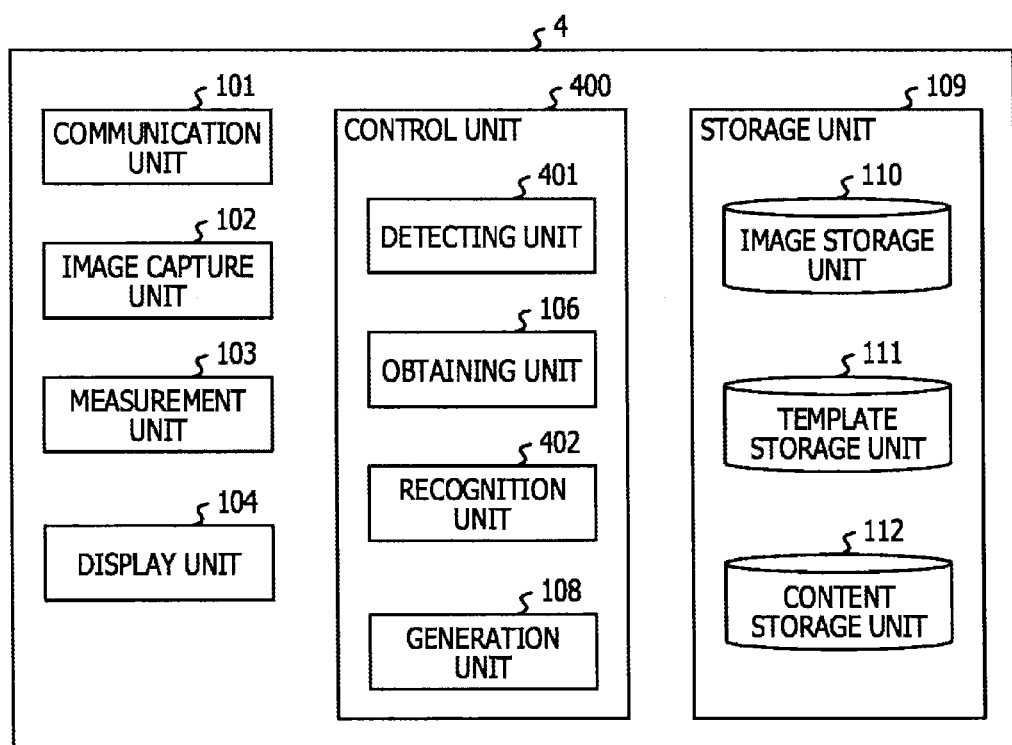
FIG. 20 is a functional block diagram of an information processing apparatus according to the third embodiment.

Next, a description will be given of the functional configuration of the information processing apparatus 4 according to the third embodiment. FIG. 20 is a functional block diagram of the information processing apparatus 4 according to the third embodiment. Processing units that are the same as or similar to those in the first embodiment are denoted by the same reference numerals, and descriptions thereof are not given hereinafter.

The information processing apparatus 4 includes a communication unit 101, an image capture unit 102, a measurement unit 103, a display unit 104, a control unit 400, and a storage unit 109. The control unit 400 includes a detecting unit 401, an obtaining unit 106, a recognition unit 402, and a generation unit 108. In addition, the storage unit 109 includes an image storage unit 110, a template storage unit 111, and a content storage unit 112. The storage unit 109 may also be the storage unit 304 according to the second embodiment. In this case, the control unit 400 also obtains additional content.

As in the first embodiment, the detecting unit 401 detects a particular operation, and also switches the mode from the first mode to the second mode, upon detecting the particular operation. As in the first embodiment, the first mode is a mode in which AR display is executed on the latest image, and the second mode is a mode in which AR display is executed on a past image that is earlier than the time when a particular operation is detected.

However, in the third embodiment, the settings of the virtual camera in each mode are different. In the first mode, the virtual camera is set so as to photograph the virtual space from a position that is equivalent to that of the camera in the real space, as in the first embodiment. On the other hand, in the second mode, the virtual camera is set at a position for capturing an image of the virtual space from an overhead perspective. The control unit 400 performs setting of the virtual camera in accordance with the mode controlled by the detecting unit 401.

As in the first embodiment, the recognition unit 402 recognizes a reference item in an image to be processed. The recognition unit 402 also generates a rotation matrix, based on the line of sight of the virtual camera, during the process of generating the transformation matrix M. That is, as described above, for example, in the second mode, the display state is switched by adding −90 (degrees) to the value of P1c obtained based on a reference-item image in the image to be processed.

Thus, the recognition unit 402 sets the position of the virtual camera in accordance with the mode set by the detecting unit 401. The recognition unit 402 then generates the transformation matrix M in accordance with the position of the virtual camera in each mode. The generation unit 108 generates a composite image, based on the transformation matrix M, as in the first embodiment, and since the transformation matrix M is generated according to the virtual camera in each mode, it is possible to generate a composite image by performing processing that is the same as or similar to that in the above-described embodiments.

Now, a description will be given of mode-control processing according to the third embodiment. The mode-control processing according to the third embodiment is analogous to the mode-control processing according to the first embodiment illustrated in FIG. 11 or the mode-control processing according to the second embodiment. In any processing, however, the detecting unit 401 in the control unit 400 performs various processes in any of the processing.

Figure 21:
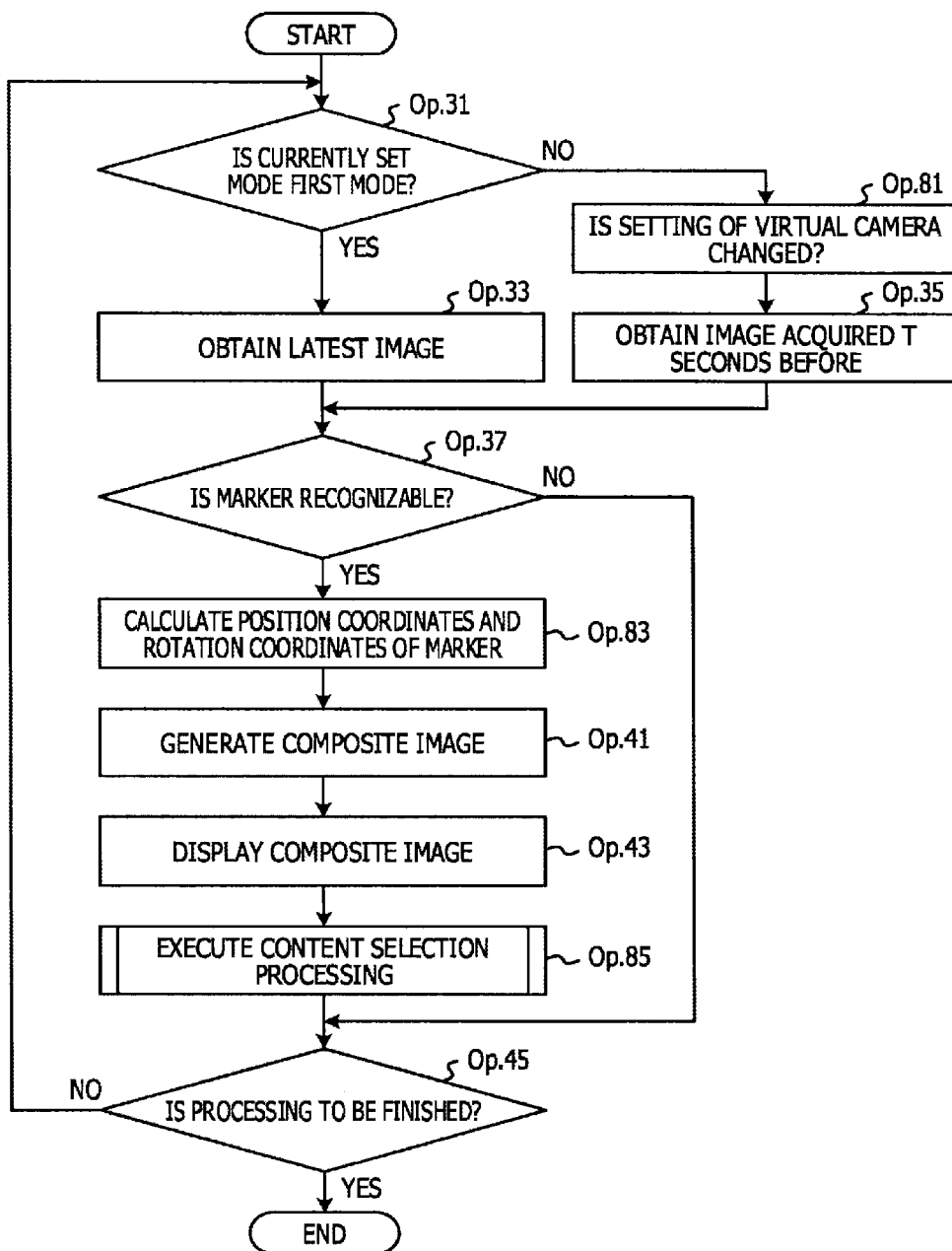
FIG. 21 is a flowchart of composite-image generation processing according to the third embodiment.

Next, a description will be given of composite-image generation processing performed in parallel with the mode-control processing. FIG. 21 is a flowchart of the composite-image generation processing according to the third embodiment. Processes that are the same as or similar to those in the first embodiment are denoted by the same reference numerals, and descriptions thereof are given briefly.

First, when the composite-image generation program is launched, the control unit 400 performs preprocessing, as in the first embodiment. The obtaining unit 106 then determines whether or not the currently set mode is the first mode (Op.31). If the currently set mode is the first mode (YES in Op.31), the obtaining unit 106 obtains a latest image from the image storage unit 110 (Op.33).

On the other hand, if the currently set mode is not the first mode, that is, the currently set mode is the second mode (NO in Op.31), the control unit 400 changes the setting of the virtual camera (Op.81). Typically, the virtual camera is set at a position having a line of sight equivalent to that of the camera that exists in the real space. However, when the currently set mode is the second mode, the virtual camera is set at a position for capturing an image of the virtual space from an overhead perspective. The obtaining unit 106 then obtains, from the image storage unit 110, an image acquired T seconds ago (Op.35).

Next, the recognition unit 402 determines whether or not a marker is recognizable in the image to be processed (Op.37). If the recognition unit 402 does not recognize a marker (NO in Op.37), the control unit 400 determines whether or not an instruction for finishing the processing is issued (Op.45). If an instruction for finishing the processing is issued (NO in Op.45), the control unit 400 returns to Op.31. If an instruction for finishing the processing is issued (YES in Op.45), the series of processes in the composite-image generation processing ends.

On the other hand, if the recognition unit 402 recognizes a marker (YES in Op.37), the recognition unit 402 calculates the position coordinates and the rotation coordinates of the marker, based on a marker image in the image to be processed (Op.83). The recognition unit 107 generates the transformation matrix M, based on the position coordinates and the rotation coordinates of the marker. In this case, the position of the virtual camera is reflected in the calculation of the position coordinates and the rotation coordinates of the marker. For example, when the setting of the virtual camera is changed in Op.81, the calculated rotation coordinates are transformed according to the setting of the virtual camera.

After Op.83, the generation unit 108 generates a composite image by using the content information for the recognized reference item, the template information, and the transformation matrix M (Op.41). The display unit 104 then displays the composite image under the control of the generation unit 108 (Op.43). The control unit 400 executes content selection processing (Op.85). The control unit 400 then executes Op.45.

Figure 22:
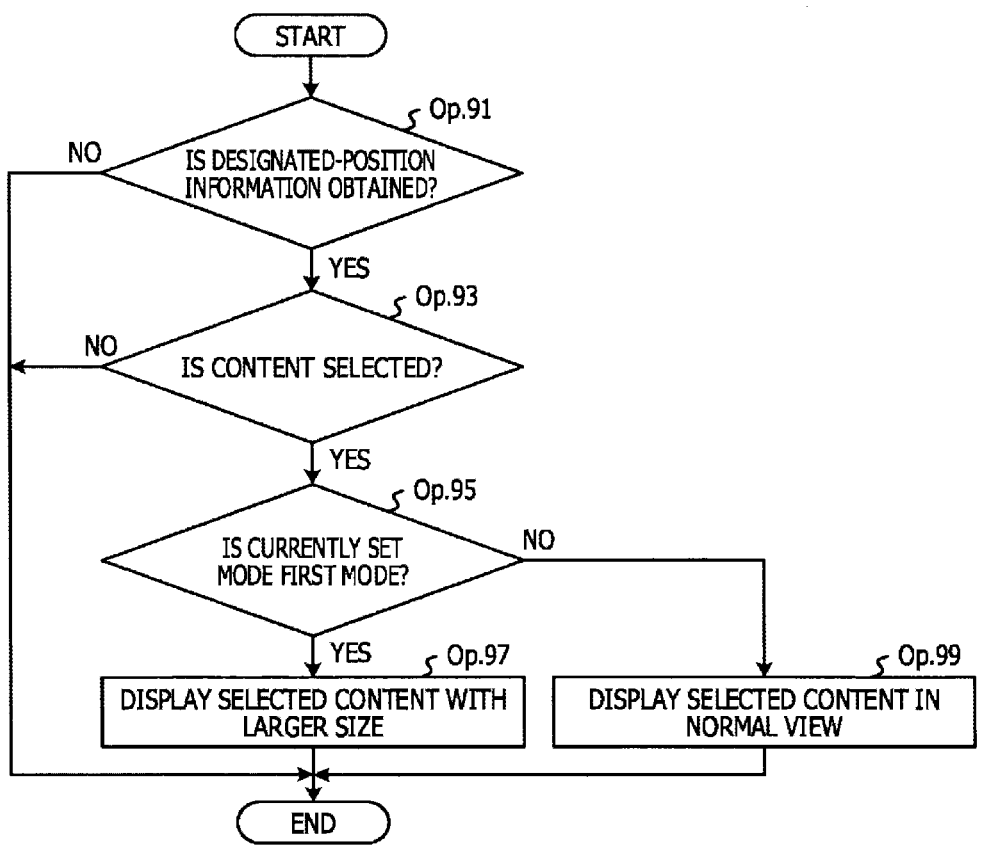
FIG. 22 is a flowchart of content selection processing.

Now, a description will be given of the content selection processing. FIG. 22 is a flowchart of the content selection processing. After the display unit 104 displays the composite image (Op.43), the control unit 400 determines whether or not designated-position information is obtained (Op.91). When the user performs a depression operation on the display, the designated-position information is output from a touch sensor, included in the display unit 104, to indicate a designated position on the display. For example, the designated-position information indicates coordinate values (Xs, Ys) in the screen coordinate system.

If the designated-position information is not obtained (NO in Op.91), the control unit 400 finishes the content selection processing. On the other hand, if the designated-position information is obtained (YES in Op.91), the control unit 400 determines whether or not content is selected (Op.93). More specifically, the control unit 400 determines whether or not the designated-position information (Xs, Ys) obtained in Op.91 is included in the region of a projected image of any AR object.

When no content is selected (NO in Op.93), the control unit 400 ends the processing. On the other hand, if content is selected (YES in Op.93), the control unit 400 identifies the selected content and determines whether or not the currently set mode is the first mode (Op.95).

If the currently set mode is the first mode (YES in Op.95), the control unit 400 controls the display unit 104 to display the selected content with a larger size (Op.97). Instead of displaying the selected content with a larger size, the selected content may also be displayed in the foreground. Thereafter, the control unit 400 ends the series of processes.

Also, if the set mode is not the first mode (NO in Op.95), the control unit 400 displays the selected content in a normal view (Op.99). Thereafter, the control unit 400 ends the series of processes.

As described above, the information processing apparatus 4 according to the third embodiment avoids a situation in which multiple pieces of content are displayed in an overlapping manner and it is thus difficult for the user to perform selection operation on the content. In addition, when the user selects any content, the selected content is displayed in a normal view in the second mode. Thus, even when text is included in the content, the user can view the details of the content.

First Modification

In the first embodiment, the second embodiment, and the third embodiment, the particular operation has been described as a user operation of rotating the information processing apparatus. That is, when the amount of rotation in T seconds is larger than or equal to the threshold, the information processing apparatus detects the particular operation. A first modification is an example in which another operation is used as the particular operation.

For example, a user operation of covering the image capture unit 102 with an object is used as the particular operation. The casing of the information processing apparatus has a camera on a surface opposite to a surface having a display unit (display) sometimes. Thus, the detecting unit 105, 301, or 401 detects a user operation of placing the information processing apparatus on a desk or his or her lap, with the camera-equipped surface being directed downward.

More specifically, the detecting unit 105, 301, or 401 generates a brightness histogram of an input image. The detecting unit 105, 301, or 401 then determines whether or not the number of pixels having a predetermined brightness value or smaller is larger than or equal to a threshold. When the number of pixels having the predetermined brightness value or smaller is larger than or equal to the threshold, the detecting unit 105, 301, or 401 detects that an operation of blocking the field of view of the camera with an object has been performed.

According to this modification, the user can perform an operation on a composite image, with the information processing apparatus being placed on a stable object. In this modification, when the number of pixels having the predetermined brightness value or smaller in the brightness histogram of an input image is smaller than the threshold, the detecting unit 105, 301, or 401 determines whether or not the second mode is to be released.

As described above, the particular operation is an operation for changing the image-capture direction when the image capture device captures an input image in which a recognized reference item is recognized to a direction in which the image capture device is not able to capture an image of the reference item.

Second Modification

The description in the third embodiment was given of a case in which the setting of the virtual camera is performed at a prior stage in which the transformation matrix M is generated. In a second modification, after generating the transformation matrix M, the information processing apparatus controls display switching according to the setting of the virtual camera.

The coordinates (Xm, Ym, Zm) of points in the marker coordinate system which constitute the content E are transformed into the coordinates (Xc, Yc, Zc) in the camera coordinate system through the model-view transformation based on the transformation matrix M. For example, the coordinates V2m are transformed into the coordinates V2c through the model-view transformation. Thereafter, in the second mode, the display state is switched according to a rotation matrix R4 illustrated in FIG. 23.

FIG. 23 illustrates a rotation matrix R4 for performing transformation corresponding to the setting of the virtual camera. First, the model-view transformation is performed according to the above-described transformation matrix M, assuming that the virtual camera is set at a position that is equivalent to that of the camera in the real space. The content coordinates (Xc, Yc, Zc) in the camera coordinate system that are subjected to the model-view transformation are referred to as coordinates (X2c, Y2c, Z2c).

The coordinates (X2c, Y2c, Z2c) are transformed into (X2c', Y2c', Z2c') through use of the rotation matrix R4. That is, when the amount of rotation at a tilt angle of the information processing apparatus is indicated by θ, the virtual camera is set at a position obtained by θ rotation at the tilt angle of the information processing apparatus in the real space. The coordinates (X2c', Y2c', Z2c') after the transformation are subjected to perspective transformation, based on equations 1 and 2 noted above, to thereby switch the display state. In this case, θ may have a fixed value (for example, 90 degrees). Alternatively, θ may be a value obtained from a gyro-sensor or the like.

Third Modification

In the first mode, only an image including a recognized reference item may be stored in the image storage unit 110 in each embodiment described above. As a result, in the second mode, an image including a reference item can be obtained from the image storage unit 110, so that a composite image including the reference item can be generated.

More specifically, in the first mode according to each embodiment, the control unit 100, 300, or 400 receives an input image from the image capture unit 102. When the recognition unit 107, 302, or 402 recognizes a reference item in the input image, the generation unit 108 or 303 generates a composite image and the recognition unit 107, 302, or 402 stores the composite image in the image storage unit 110. The image storage unit 110 may also store therein only a most-recent input image (including a reference item) and may also store therein input images for a predetermined number of frames.

When the mode is switched from the first mode to the second mode under the control of the detecting unit 105, 301, or 401, the obtaining unit 106 obtains an image from the image storage unit 110, and the obtained image is an image that was captured before the detection of the particular operation and that includes a reference item. Although the image obtained from the image storage unit 110 in each embodiment described above is an image that is highly likely to include a reference item, the image obtained from the image storage unit in this modification is an image that almost certainly includes a reference item.

As described above, according to the third modification, it is possible to continue AR display on an image that almost certainly includes a reference item, the image being captured before the mode switching.

[Example Hardware Configuration]

Figure 24:
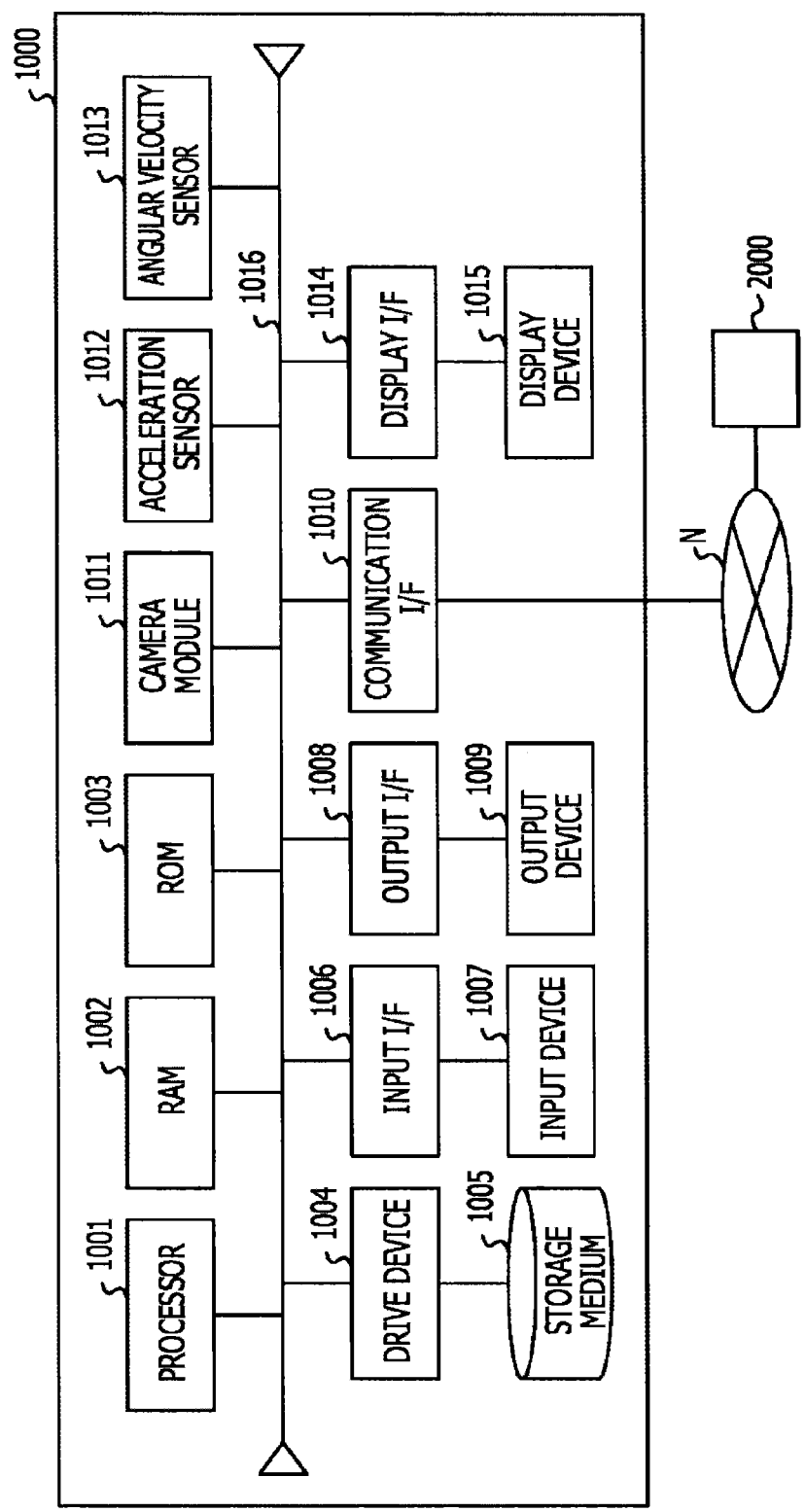
FIG. 24 illustrates an example hardware configuration of the information processing apparatus in each embodiment.

A description will be given of the hardware configuration of the apparatus described above in each embodiment. FIG. 24 illustrates an example hardware configuration of the information processing apparatus in each embodiment. The information processing apparatus 1, the information processing apparatus 3, and the information processing apparatus 4 are each realized by a computer 1000. The functional blocks illustrated in FIGS. 7, 15, and 20 are realized by, for example, the hardware configuration illustrated in FIG. 24.

The computer 1000 includes, for example, a processor 1001, a random access memory (RAM) 1002, a read only memory (ROM) 1003, a drive device 1004, a storage medium 1005, an input interface (input I/F) 1006, an input device 1007, output interface (output I/F) 1008, an output device 1009, a communication interface (communication I/F) 1010, a camera module 1011, an acceleration sensor 1012, an angular velocity sensor 1013, a display interface (display I/F) 1014, a display device 1015, and a bus 1016. The individual pieces of hardware are coupled through the bus 1016.

The communication interface 1010 controls communication through the network N. The communication controlled by the communication interface 1010 may be a type of communication for accessing the network N via a wireless base station by utilizing wireless communication. One example of the communication interface 1010 is a network interface card (NIC). The input interface 1006 is coupled to the input device 1007 to transmit an input signal, received from the input device 1007, to the processor 1001. The output interface 1008 is coupled to the output device 1009 to cause the output device 1009 to execute an output corresponding to an instruction from the processor 1001. One example of the input interface 1006 and the output interface 1008 is an input/output (I/O) controller.

The input device 1007 transmits an input signal in accordance with an operation. Examples of the input device 1007 include key devices, such a keyboard and buttons attached to the main unit of the computer 1000, and pointing devices, such as a mouse and a touch panel. The output device 1009 outputs information in accordance with control performed by the processor 1001. The output device 1009 is, for example, a sound output device, such as a speaker.

The display interface 1014 is coupled to the display device 1015. The display interface 1014 causes the display device 1015 to display image information written to a display buffer, provided in the display interface 1014, by the processor 1001. Examples of the display interface 1014 include a graphics card and a graphics chip. The display device 1015 outputs information in accordance with control performed by the processor 1001. The display device 1015 is implemented by an image output device, such as a display, or a transmissive display.

When the display device 1015 is implemented by a transmissive display, control may be performed so that a projected image of AR content is displayed, for example, at an appropriate position on the transmissive display, rather than being combined with a captured image. Such control provides the user with vision that is in a state in which the real space and the AR content match each other. For example, an input/output device, such as a touch screen, is used as the input device 1007 and the display device 1015. Instead of the input device 1007 and the display device 1015 being incorporated into the computer 1000, for example, the input device 1007 and the display device 1015 may be externally connected to the computer 1000.

The RAM 1002 is a readable and writable memory device and may be implemented by, for example, a semiconductor memory, such as a static RAM (SRAM) or a dynamic RAM (DRAM), or a flash memory, other than a RAM. The ROM 1003 includes, for example, a programmable ROM (PROM).

The drive device 1004 performs at least one of reading information stored in/on the storage medium 1005 or writing information thereto. Information written by the drive device 1004 is stored in/on the storage medium 1005. The storage medium 1005 is at least one of storage media including, for example, a hard disk, a solid-state drive (SSD), a compact disc (CD), a digital versatile disc (DVD), and a Blu-ray Disc. For example, the drive device 1004 included in the computer 1000 corresponds to the type of storage medium 1005 in the computer 1000.

The camera module 1011 includes an image-capture element (an image sensor) and writes data, obtained via photoelectric conversion of the image-capture element, to an image buffer for input images which is included in the camera module 1011. The acceleration sensor 1012 measures an acceleration that acts on the acceleration sensor 1012. The angular velocity sensor 1013 measures an angular velocity of an operation of the angular velocity sensor 1013.

The processor 1001 reads out a program, stored in/on the ROM 1003 and/or the storage medium 1005, to the RAM 1002, and performs processing in accordance with a procedure of the read program. For example, the processor 1001 controls other hardware, based on the mode control program and the composite-image generation program, to thereby realize the functions of the control unit 100, 300, or 400 in each embodiment.

The processor 1001 controls the communication interface 1010 to execute data communication and to store received data in the storage medium 1005, to thereby realize the functions of the communication unit 101.

The ROM 1003 and the storage medium 1005 store a program file and/or a data file therein/thereon and the RAM 1002 is used as a work area for the processor 1001, to thereby realize the functions of the storage unit. For example, the content information, the template information, and the management information are stored in the RAM 1002.

The camera module 1011 writes image data to the input-image buffer and the processor 1001 reads the image data in the input-image buffer, to thereby realize the functions of the image capture unit 102. In a monitoring mode, the image data is written to, for example, the input-image buffer and is also written to the display buffer for the display device 1015.

Also, image data generated by the processor 1001 is written to the display buffer provided in the display interface 1014 and the display device 1015 displays the image data in the display buffer, to thereby realize the functions of the display unit 104.

Figure 25:
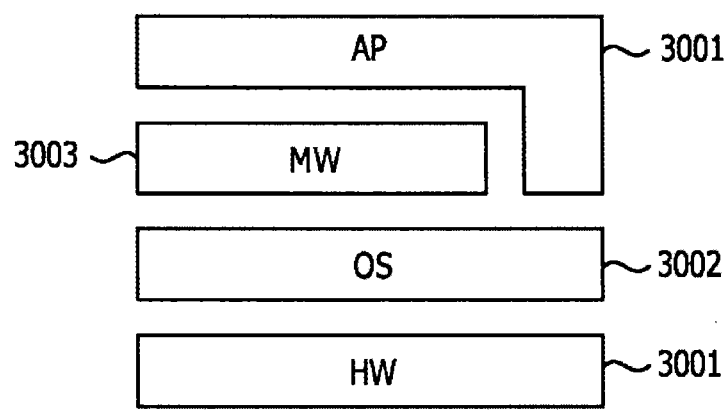
FIG. 25 illustrates an example configuration of programs that run on the computer.

FIG. 25 illustrates an example configuration of programs that run on the computer 1000. An operating system (OS) 3002 that controls the hardware runs on the computer 1000. The processor 1001 operates in accordance with a procedure according to the OS 3002 to control and manage hardware (HW) 3001 and middleware (MW) 3003, to thereby execute processing of an application program (AP) 3004 on the HW 3001.

In the computer 1000, the OS 3002 and programs for the MW 3003, the AP 3004, and so on are read out to, for example, the RAM 1002 and are executed by the processor 1001. The mode control program and the composite-image generation program in each embodiment are, for example, programs called from the AP 3004 as the MW 3003.

The mode control program and the composite-image generation program may also be included in an AR control program. For example, the AR control program is a program for realizing the AR function as the AP 3004. The AR control program is stored in the storage medium 1005. The storage medium 1005 may be separately distributed from the main unit of the computer 1000, with the AR control program being stored. Also, the storage medium 1005 may be distributed with only the mode control program or the composite-image generation program being stored.

Figure 26:
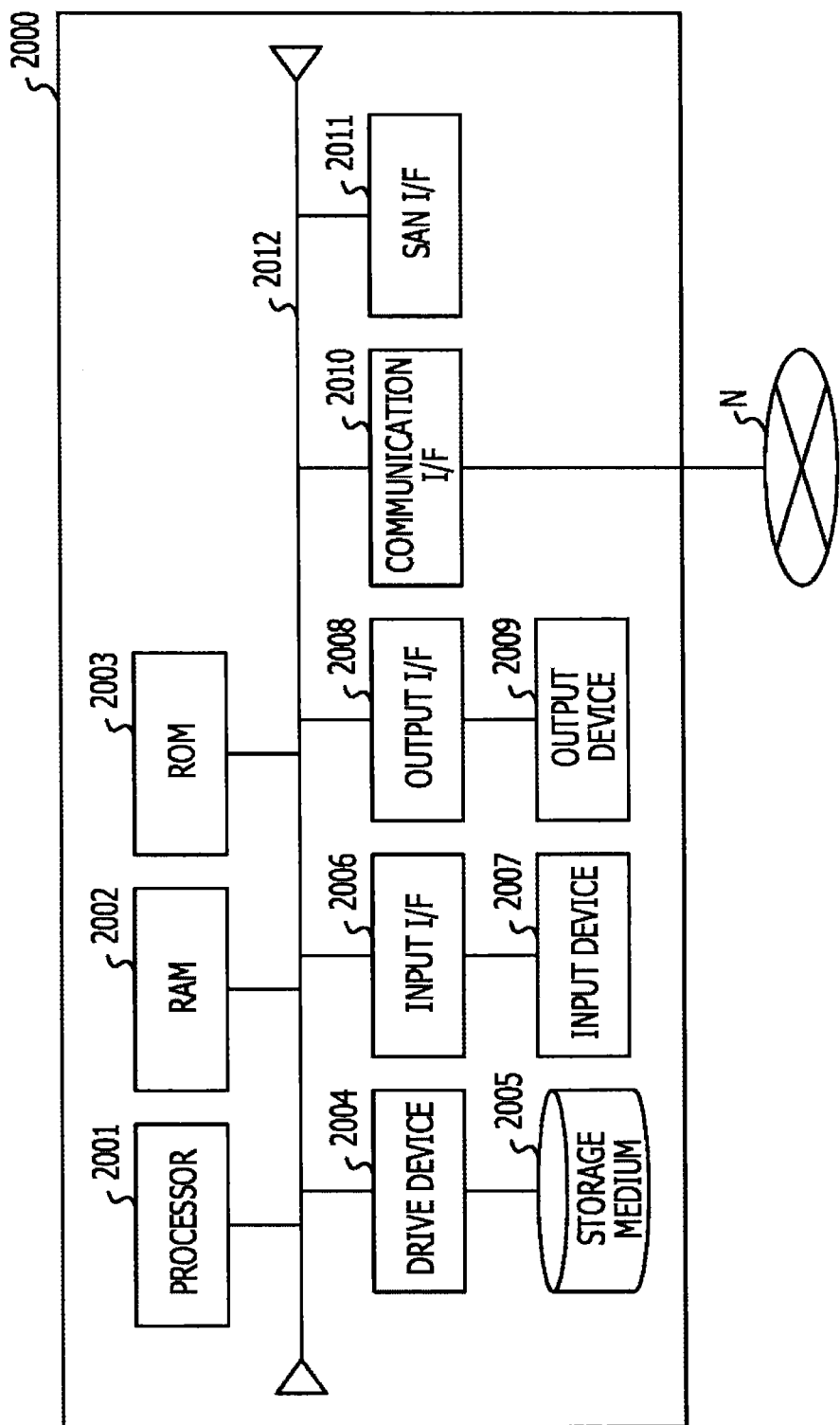
FIG. 26 illustrates an example hardware configuration of a management apparatus.

Next, a description will be given of the hardware configuration of the management apparatus 2 in each embodiment. FIG. 26 illustrates an example hardware configuration of the management apparatus 2. The management apparatus 2 is realized by a computer 2000. The management apparatus 2 is realized by, for example, the hardware configuration illustrated in FIG. 26. The computer 2000 includes, for example, a processor 2001, a RAM 2002, a ROM 2003, a drive device 2004, a storage medium 2005, an input interface (input I/F) 2006, an input device 2007, an output interface (output I/F) 2008, an output device 2009, a communication interface (communication I/F) 2010, a storage area network interface (SAN I/F) 2011, and a bus 2012. The individual pieces of hardware are coupled through the bus 2012.

For example, the processor 2001 is hardware that is the same as or similar to the processor 1001. The RAM 2002 is hardware that is the same as or similar to, for example, the RAM 1002. The ROM 2003 is hardware that is the same as or similar to, for example, the ROM 1003. The drive device 2004 is hardware that is the same as or similar to, for example, the drive device 1004. The storage medium 2005 is hardware that is the same as or similar to, for example, the storage medium 1005. The input interface (input I/F) 2006 is hardware that is the same as or similar to, for example, the input interface 1006. The input device 2007 is hardware that is the same as or similar to, for example, the input device 1007.

The output interface (output I/F) 2008 is hardware that is the same as or similar to, for example, the output interface 1008. The output device 2009 is hardware that is the same as or similar to, for example, the output device 1009. The communication interface (communication I/F) 2010 is hardware that is the same as or similar to, for example, the communication interface 1010. The storage area network interface (SAN I/F) 2011 is an interface for connecting the computer 2000 to a SAN and includes a host bus adapter (HBA).

The processor 2001 reads out a program, stored in the ROM 2003 and/or the storage medium 2005, to the RAM 2002 and performs processing in accordance with the procedure of the read program. During the processing, the RAM 2002 is used as a work area for the processor 2001. The program may include a program for various types of processing in the management apparatus 2. For example, the program is a program that states processing for selecting the template information, the content information, and image-capture condition information to be supplied to the computer 1000 or the like.

The ROM 2003 and the storage medium 2005 store a program file and a data file therein/thereon or the RAM 2002 is used as a work area for the processor 2001, to thereby allow the management apparatus 2 to store various types of information. The processor 2001 also controls the communication interface 2010 to perform communication processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing computer-program, which when executed by a system, causes the system to:
    obtain first image data from an image capture device;
    detect an image corresponding to an object from the first image data;
    control a display to display the first image data and object data on the first image data when the image is detected, the object data being associated with the image and stored in a memory;
    obtain second image data from the image capture device after obtaining the first image data;
    control the display to continue displaying the first image data and the object data on the first image data when a certain operation of the image capture device is detected, wherein the certain operation is an operation changing an image capturing direction of the image capture device from a first image capturing direction at which the object is captured to a second capturing direction at which the object is not captured; and
    control the display to display the second image data when the certain operation is not detected.

2. The non-transitory computer-readable medium according to claim 1, wherein the computer-program causes the system to:
    detect the image from the second image data, when the certain operation is not detected; and
    display the object data on the second image data based on detected image data.

3. The non-transitory computer-readable medium according to claim 1, wherein the computer-program causes the system to:
    send a request to acquire additional object data associated with the object data, when the certain operation is detected; and
    receive a response including the additional object data.

4. The non-transitory computer-readable medium according to claim 3, wherein the computer-program causes the system to:
    receive an instruction to display the additional object data; and
    display the additional object data based on the received instruction.

5. The non-transitory computer-readable medium according to claim 1, wherein the computer-program causes the system to:
    switch a display state of the object data on the first image data from a first view to a second view.

6. The non-transitory computer-readable medium according to claim 5, wherein
    the first view is front view of the object data, and
    the second view is overhead view of the object data.

7. The non-transitory computer-readable medium according to claim 5, wherein
    in the first view the object data is a first size, and
    in the second view the object data is a second size, which is smaller than the first size.

8. The non-transitory computer-readable medium according to claim 1, wherein
    the object is a marker.

9. The non-transitory computer-readable medium according to claim 1, wherein
    the image data is an image of the object.

10. A system comprising:
    circuitry configured to
        obtain first image data from an image capture device;
        detect an image corresponding to an object from the first image data;
        control a display to display the first image data and object data on the first image data when the image is detected, the object data being associated with the image and stored in a memory;
        obtain second image data from the image capture device after obtaining the first image data;
        control the display to continue displaying the first image data and the object data on the first image data when a certain operation of the image capture device is detected, wherein the certain operation is an operation changing an image capturing direction of the image capture device from a first image capturing direction at which the object is captured to a second capturing direction at which the object is not captured; and
        control the display to display the second image data when the certain operation is not detected.

11. The system according to claim 10, wherein the system is a portable electronic device including the circuitry, the image capture device and the display.

12. The system according to claim 10, wherein the circuitry is configured to:
    send a request to acquire additional object data associated with the object data, when the certain operation is detected; and
    receive a response including the additional object data.

13. The system according to claim 12, further comprising:
    a server configured to receive the request to acquire the additional object data, and output the additional object data.

14. The system according to claim 10, wherein the circuitry is configured to:
switch a display state of the object data on the first image data from a first view to a second view.

15. A display control method performed by an information processing device, the method comprising:
obtaining first image data from an image capture device;
detecting an image corresponding to an object from the first image data;
controlling a display to display the first image data and object data on the first image data when the image is detected, the object data being associated with the image and stored in a memory;
obtaining second image data from the image capture device after obtaining the first image data;
controlling, by the information processing device, the display to continue displaying the first image data and the object data on the first image data when a certain operation of the image capture device is detected, wherein the certain operation is an operation changing an image capturing direction of the image capture device from a first image capturing direction at which the object is captured to a second capturing direction at which the object is not captured; and
controlling the display to display the second image data when the certain operation is not detected.

16. A non-transitory computer-readable medium storing computer-program, which when executed by a system, causes the system to:
obtain first image data from an image capture device;
detect an image corresponding to an object from the first image data;
control a display to display the first image data and object data on the first image data when the image is detected, the object data being associated with the image and stored in a memory;
obtain second image data from the image capture device after obtaining the first image data;
control the display to continue displaying the first image data and the object data on the first image data when a movement amount of the image capture device since obtaining the first image data exceeds a predetermined threshold value;
control the display to display the second image data when the movement amount of the image capture device since obtaining the first image data does not exceed the predetermined threshold value.

17. The non-transitory computer-readable medium according to claim 16, wherein the computer-program causes the system to:
acquire information indicating an amount of rotation of the image capture device, wherein
the movement amount corresponds to the amount of rotation of the image capture device, and the predetermined threshold value corresponds to a predetermined number of degrees of movement of the image capture device since acquiring the first image data.

* * * * *